US012153973B2

(12) United States Patent
Morris et al.

(10) Patent No.: US 12,153,973 B2
(45) Date of Patent: Nov. 26, 2024

(54) FUEL DISPENSER REMOTE CONTENT PROVISION

(71) Applicant: Wayne Fueling Systems LLC, Austin, TX (US)

(72) Inventors: John Joseph Morris, Austin, TX (US); Jerzy Zyglowicz, Raciborsko (PL); Rohith Chinnaswamy, RoundRock, TX (US); Scott R. Negley, III, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 18/342,391

(22) Filed: Jun. 27, 2023

(65) Prior Publication Data
US 2024/0111614 A1 Apr. 4, 2024

Related U.S. Application Data

(60) Provisional application No. 63/377,938, filed on Sep. 30, 2022.

(51) Int. Cl.
*G06Q 30/0601* (2023.01)
*B67D 7/14* (2010.01)
(Continued)

(52) U.S. Cl.
CPC ............ *G06F 9/547* (2013.01); *B67D 7/145* (2013.01); *B67D 7/22* (2013.01); *G06Q 20/02* (2013.01);
(Continued)

(58) Field of Classification Search
CPC ..... G06F 9/547; G06Q 20/02; G06Q 30/0635
See application file for complete search history.

(56) References Cited

U.S. PATENT DOCUMENTS 7,107,231 B1 * 9/2006 Hall .................. G06Q 30/0273
705/14.38
10,318,963 B1 * 6/2019 Prasad ................ G06Q 30/018
(Continued)

FOREIGN PATENT DOCUMENTS

WO 2018222699 A1 12/2018

OTHER PUBLICATIONS

International Search Report and Written Opinion for Application No. PCT/US2023/069166, mailed on Sep. 25, 2023, 12 pages.

*Primary Examiner* — Anil K Bhargava
(74) *Attorney, Agent, or Firm* — Mintz, Levin, Cohn, Ferris, Glovsky and Popeo, P.C.

(57) ABSTRACT

Embodiments of the present disclosure include a method including receiving, by a data processor of a fuel dispenser, first data characterizing one or more applications to be displayed via a display of the fuel dispenser during a first application session. The first data including a configuration file including an application programming interface (API) uniform resource locator (URL) associated with a first remote server from which modified application data associated with the one or more applications may be received by the data processor by accessing the API URL. Embodiments may also include displaying, based on the first data, a first instance of at least one application in at least one display frame of the display, the at least one application configured to receive user inputs from a user of the fuel dispenser. Related apparatus, systems, and articles are also described.

21 Claims, 13 Drawing Sheets

(51) Int. Cl.

| | | |
|---|---|---|
| *B67D 7/22* | (2010.01) | |
| *G06F 9/54* | (2006.01) | |
| *G06Q 20/02* | (2012.01) | |
| *G06Q 20/32* | (2012.01) | |
| *B67D 7/04* | (2010.01) | |

(52) U.S. Cl.
CPC ....... *G06Q 20/326* (2020.05); *G06Q 30/0635* (2013.01); *G06Q 30/0641* (2013.01); *B67D 2007/044* (2013.01)

(56) References Cited

U.S. PATENT DOCUMENTS

| | | | | |
|---|---|---|---|---|
| 10,332,083 | B2* | 6/2019 | Williams | G06Q 20/227 |
| 10,577,237 | B2* | 3/2020 | Fieglein | G07F 9/001 |
| 10,677,237 | B2* | 6/2020 | Li | F04B 43/0045 |
| 2002/0111924 | A1* | 8/2002 | Lewis | G06Q 30/06 |
| | | | | 705/413 |
| 2002/0156835 | A1* | 10/2002 | Williams | G06Q 30/02 |
| | | | | 700/241 |
| 2003/0075600 | A1* | 4/2003 | Struthers | B67D 7/14 |
| | | | | 235/381 |
| 2003/0131904 | A1* | 7/2003 | Dodson | B60S 5/02 |
| | | | | 141/192 |
| 2007/0088624 | A1* | 4/2007 | Vaughn | G06Q 30/02 |
| | | | | 705/26.81 |
| 2007/0106559 | A1* | 5/2007 | Harrell | G06Q 20/12 |
| | | | | 705/21 |
| 2017/0083988 | A1* | 3/2017 | Butsch | G06Q 20/202 |
| 2018/0352265 | A1* | 12/2018 | Carapelli | G06Q 30/02 |
| 2019/0330047 | A1* | 10/2019 | Joginipelly | B67D 7/3272 |
| 2020/0357082 | A1* | 11/2020 | Malik | G06Q 20/3821 |
| 2022/0207566 | A1* | 6/2022 | Braslavsky | G06Q 30/0255 |
| 2022/0301081 | A1* | 9/2022 | Malik | G06Q 20/3821 |
| 2024/0046296 | A1* | 2/2024 | Pfau | G06Q 30/02 |
| 2024/0056392 | A1* | 2/2024 | Zhang | H04L 45/741 |

* cited by examiner

FUEL DISPENSER REMOTE CONTENT PROVISION

CROSS-REFERENCE TO RELATED APPLICATIONS

This application claims the benefit of U.S. Provisional Application No. 63/377,938, entitled "HOSTED APPS MARKETPLACE SYSTEM," filed on Sep. 30, 2022, which is incorporated by reference herein in its entirety.

FIELD

The current subject matter relates to methods and systems for providing third-party content and facilitating transactions associated with the third party content via a fuel dispenser configured in a dispensing environment.

BACKGROUND

Fuel dispensing environments can include displays configured to provide fueling and financial transaction data associated with operation of a fuel dispenser. The displays provide a limited amount of data, usually in a textual format, requiring a user of the dispenser to conduct further transactions, such as purchases of a food item or vehicle service, at another location remote from the fuel dispenser, which can result in a negative customer experience for a user of the fuel dispenser. Fuel dispensers often lack computing resources, such as data storage, processing power, or network connectivity, necessary to store or provide application data which could enhance the customer experience. Providing customized content or application data to user of a fuel dispenser can result in increased satisfaction for fuel dispenser users and increased sales for operators of the fuel dispensing environment. Yet, solutions to generate and provide content or application data customized for fuel dispenser users are limited and expensive to implement due to complexity and costs of upgrading or retrofitting computing systems within the fuel dispensing environment. Improved systems and method of generating and providing customized content from remote sources in fuel dispensing environments are needed.

SUMMARY

Methods and systems for provision of remote content via a fuel dispenser are provided. Related apparatus, techniques, and articles are also described.

In one aspect, a method is provided. In an embodiment, the method can include receiving, by a data processor of a fuel dispenser, first data characterizing one or more applications to be displayed via a display of the fuel dispenser during a first application session. The first data can include a configuration file including an application programming interface (API) uniform resource locator (URL) associated with a first remote server from which modified application data associated with the one or more applications may be received by the data processor by accessing the API URL. The method can also include displaying, based on the first data, a first instance of at least one application in at least one display frame of the display. The at least one application can be configured to receive user inputs from a user of the fuel dispenser. The method can further include receiving, by the data processor of the fuel dispenser, second data characterizing a user input provided to the first instance of the at least one application via the at least one display frame. The method can also include determining, by the data processor of the fuel dispenser, modified application data associated with the first instance of the at least one application based on the user input. The method can further include generating, by the data processor, a second instance of the at least one application based on the modified application data. The method can also include displaying, within the at least one display frame, the second instance of the at least one application via the API URL.

In another aspect, a fuel dispenser is provided. In one embodiment, the fuel dispenser can include a display including one or more display frames, a communications module, a data processor, and a memory storing non-transitory computer-readable instructions, which when executed by the data processor cause the data processor to perform operations which can include receiving first data characterizing one or more applications to be displayed via the display during a first application session. The first data can include a configuration file including an application programming interface (API) uniform resource locator (URL) associated with a first remote server from which modified application data associated with the one or more applications may be received by the data processor by accessing the API URL. The operations can also include displaying, based on the first data, a first instance of at least one application in at least one display frame of the display. The at least one application can be configured to receive user inputs from a user of the fuel dispenser. The operations can further include receiving second data characterizing a user input provided to the first instance of the at least one application via the at least one display frame. The operations can also include determining modified application data associated with the first instance of the at least one application based on the user input. The operations can further include generating a second instance of the at least one application based on the modified application data and displaying the second instance of the at least one application via the API URL within the at least one display frame.

In another aspect, a non-transitory computer readable medium storing computer-readable and executable instructions is provided. In one embodiment, the instructions which when executed by at least one data processor of at least one computing system can cause the at least one data processor to perform operations which can include receiving first data characterizing one or more applications to be displayed via a display of a fuel dispenser during a first application session. The first data can include a configuration file including an application programming interface (API) uniform resource locator (URL) associated with a first remote server from which modified application data associated with the one or more applications may be received by the data processor by accessing the API URL. The operations can also include providing, based on the first data, a first instance of at least one application for display in at least one display frame of the display. The at least one application can be configured to receive user inputs from a user of the fuel dispenser. The operations can further include receiving second data characterizing a user input provided to the first instance of the at least one application via the at least one display frame. The operations can also include determining modified application data associated with the first instance of the at least one application based on the user input. The operations can further include generating, by the data processor, a second instance of the at least one application based on the modified application data and providing, within the at least one display frame, the second instance of the at least one application for display via the API URL.

In another aspect, a system is provided. In an embodiment, the system can include a remote server including a memory storing one or more applications and a configuration file including an application programming interface (API) uniform resource locator (URL). The system can also include a network and a fuel dispenser communicably coupled to the remote server via the network. The fuel dispenser can include a display including one or more display frames, a communications module, a data processor, and a memory storing non-transitory computer-readable instructions, which when executed by the data processor cause the data processor to perform operations which can include receiving, from the remote server, first data characterizing the one or more applications to be displayed via the display during a first application session. The first data can include the configuration file including the application programming interface (API) uniform resource locator (URL) associated with a first remote server from which modified application data associated with the one or more applications may be received by the data processor by accessing the API URL. The operations can also include providing, based on the first data, a first instance of at least one application for display in at least one display frame of the display. The at least one application can be configured to receive user inputs from a user of the fuel dispenser. The operations can further include receiving second data characterizing a user input provided to the first instance of the at least one application via the at least one display frame. The operations can also include determining modified application data associated with the first instance of the at least one application based on the user input. The operations can further include generating a second instance of the at least one application based on the modified application data and providing the second instance of the at least one application via the API URL for display within the at least one display frame.

One or more of the following features can be included in any feasible combination. For example, in another embodiment, the configuration file can include a plurality of parameters associated with displaying instances of the at least one application within the at least one display frame. The plurality of parameters can include at least one of a fuel pump ID, a phone number of the user, a loyalty identifier of the user, a digital receipt phone number, and a fuel dispenser state. In one embodiment, instances of the one or more applications may be stored in a memory of the fuel dispenser or may be received via a communication module of the fuel dispenser from the first remote server associated with the at least one application. In some embodiments, the modified application data may be further determined based on event data generated by the data processor of the fuel dispenser, the event data including at least one of a display size change, a language change, a display contrast change, a volume change, or a fuel dispenser state change.

In another embodiment, responsive to generating the fuel dispenser state change event data during the first application session, the method may also include determining, by the data processor of the fuel dispenser, a third instance of the at least one application to be displayed during the first application session. The method may further include displaying, via the at least one display frame, the third instance of the at least one application. The method may further include receiving, by the data processor of the fuel dispenser, a second user input including a phone number of the user provided to the third instance of the at least one application. The method may also include transmitting, responsive to the second user input, a fourth instance of the at least one application to a computing device of the user. The fourth instance can be displayed on the computing device of the user as a second application session of the at least one application.

In some embodiments, the fourth instance of the at least one application can include an order corresponding to one or more items or services provided for selection via the third instance of the at least one application and selected by the user from within the at least one display frame. In some embodiments, the order may be transmitted to the first remote server associated with the at least one application and the first remote server may be configured to transmit the order to a kitchen display system configured to display the order for fulfillment.

In some embodiments, the third instance of the at least one application may include an authentication challenge displayed via the at least one display frame, the method can further include receiving, by the data processor of the fuel dispenser, authentication credentials of the user. The method can also include transmitting, by the communication module of the fuel dispenser, the authentication credentials to the first remote server associated with the at least one application. The method can further include determining, by the first remote server, a verified identity of the user based on matching the authentication credentials to second authentication credentials associated with the at least one application configured on the computing device of the user. The method can also include transmitting by the first remote server, an indication of the verified identify of the user to the data processor of the fuel dispenser. The method can also include providing, the indication of the verified identity of the user for display via the at least one display frame responsive to receiving the transmitted indication and prior to transmitting the fourth instance of the application as the second application session.

In some embodiments, the fuel dispenser may be communicably coupled to a second remote server associated with a first entity and the one or more applications may be associated with a second entity different than the first entity. In some embodiments, the first data may be received from the second remote server.

The non-transitory computer program products (i.e., physically embodied computer program products) described herein can store instructions, which when executed by one or more data processors of one or more computing systems, can cause at least one data processor to perform operations herein. Similarly, the computer systems described herein can include one or more data processors and memory that can be coupled to the one or more data processors. The memory may temporarily or permanently store instructions that cause at least one processor to perform one or more of the operations described herein. In addition, the methods described herein can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
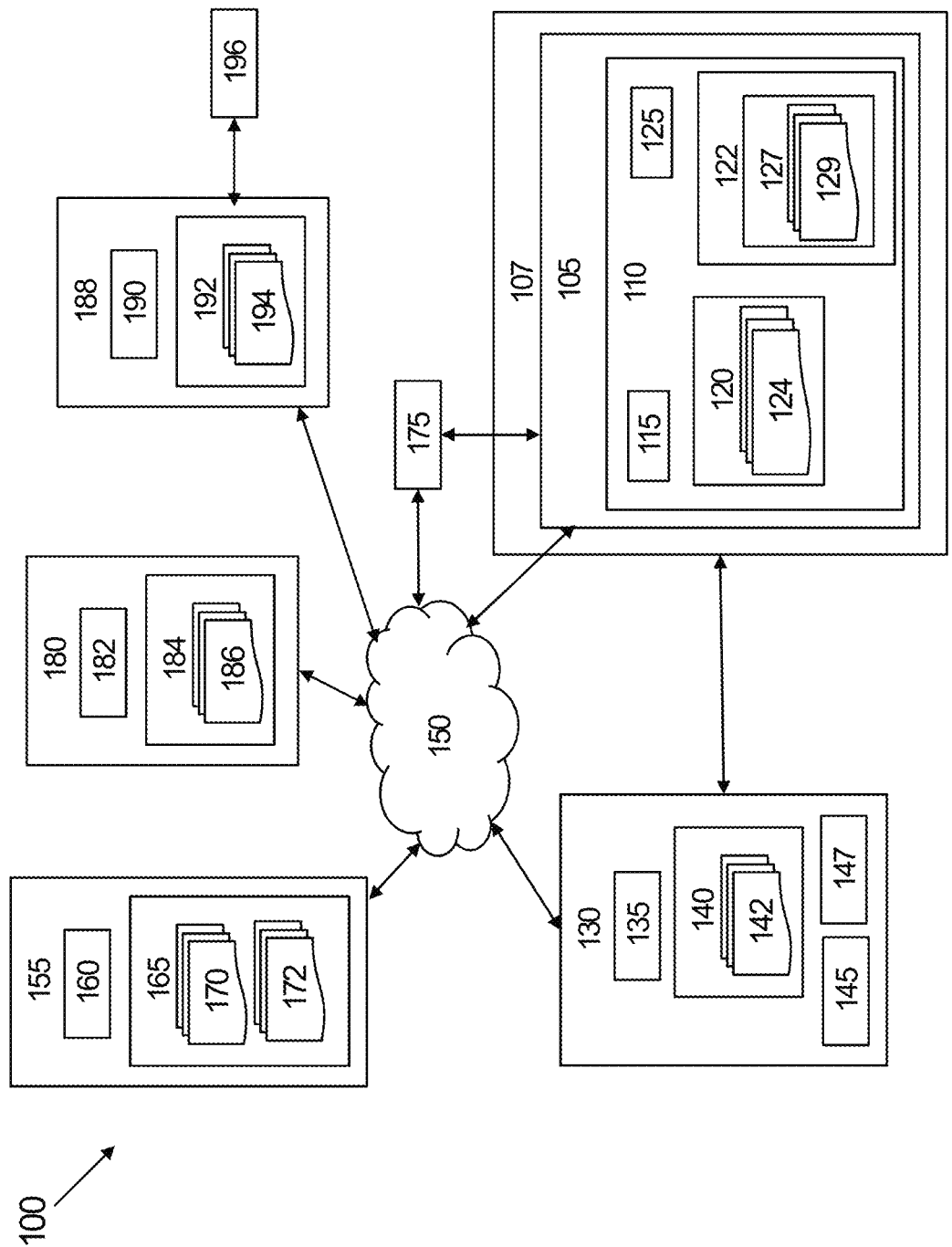
FIG. 1 is a system diagram illustrating an example system of some implementations of the current subject matter that can provide remote content via a fuel dispenser.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Existing fuel dispensers can have displays that are limited to only displaying operational data associated with dispensing fuel. Often, these fuel dispensers lack computing resources and/or network connectivity necessary to display additional data to a user of the fuel dispenser. As a result, the fuel dispenser user experience is limited and as a result, the fuel dispenser user is precluded from experiencing content, items, or services that could be offered by the fuel dispenser operator or affiliated providers of content, items, or services which would enhance the user experience at the fuel dispenser. Given the preponderance of applications and customized data providing unique user experiences in regard to consuming information and goods or services on personal computing devices, there exists a need for enhancing the user experience of fuel dispensers in ways legacy fuel dispensers cannot provide. There exists a need for a configurable data and system architecture that can provide content from remote sources via a display of a fuel dispenser in ways that can allow the display to be easily modified by the fuel dispenser operator, require reduce computing and networking resources, and can provide a unique, personalized experience to the fuel dispenser user that can easily and seamlessly carry over to their personal computing devices.

In general, systems and methods for providing dynamically configurable content from remote sources in displays of a fuel dispenser are provided here to address the aforementioned limitations and needs. Given content, such as application data configured on remote computing devices or servers, the system and methods herein can configure a fuel dispenser to receive the content and to provide the content for display via configurable display frames that can be adapted based on a configuration file corresponding to the content providers. The configuration file can specify the arrangement of display frames and how the content is displayed within a display frame based on user inputs and/or event data associated with operation of the fuel dispenser. The configuration file can further include data characterizing an application programming interface by which content modified in regard to the user inputs and/or fuel dispenser event data can be used to instances of the content provided in the display frames. The systems and methods herein can further allow displayed content initiated in a display frame of the fuels dispenser to be provided to a computing device of the user in a way that continues the user experience away from the fuel dispenser.

Advantageously, the system and methods herein can enable fuel dispenser operators to deploy third-party content, such as applications associated with retail purchasing of goods or services, in a configurable manner within a display of a fuel dispenser. As a result, users are more likely to conduct business in a fuel dispensing environment that provides a more robust user experience for their data consumption and retail purchasing needs. This can lead to enhanced customer loyalty, increased sales, and greater utilization of third party products or services. Additionally, the systems and methods herein preclude the need for specialized computing and networking resources which can be required to provide a robust user experience during the provision of remote content.

FIG. 1 is a system diagram illustrating an example system 100 that incorporates some implementations of the current subject matter and that can provide for the same. As shown in FIG. 1, the system 100 includes a fuel dispenser 105 that is disposed in a fueling environment 107. The fueling environment 107 can be a fueling station and can include a fueling forecourt where a vehicle can be fueled by a user operating the fuel dispenser 105. The fuel dispenser 105 can include a computing device 110. The computing device 110 can include at least one data processor 115 configured to perform one or more aspects of the functionality described herein, and memory 120 for storing instructions for performing one or more aspects of the functionality described herein. For example, the memory 120 can include one or more applications 124 configured to provide static, dynamic, and/or executable content in textual and/or graphical formats or presentations via the display 122. The one or more applications can be stored within the memory 120 or can be received from a remote computing device, such as a remote server. In some embodiments, the applications 124 can include a weather application, a traffic application, a media application, a retail purchasing application, a loyalty program application, or the like. The retail purchasing application can be configured to present content associated with good or services available for purchase. Responsive to user input, a user can create an order of goods or services for purchase.

The display 122 can be an interactive display 122 that is in operable communication with the at least one data processor 115. The display 122 can include one or more display frames 129 that can be configured within a graphical user interface (a GUI or simply a UI) 127 of the display 122. Content associated with the applications 124 can be displayed within the user interface 127 and/or the display frames 129. In some embodiments, the display frames 129 can be in-line elements, such as an iframe, implemented via HTML within a web page displayed on the user interface 129. The user interface 127 can include controls for adjusting aspects of the user interface 127, such as a screen contrast, a display size, a volume, or a language. In some embodiments, a display frame 129 can include an input display configured to receive a user input corresponding to a phone number or a loyalty identifier. The input display can include a field showing entered values and a numeric keypad for entering a phone number of the fuel dispenser user or loyalty identifier of the fuel dispenser user. In this way, based on input of the phone number or the loyalty identifier, the content displayed via the display frames 129 associated with the applications 124 can be customized for a particular user. For example, based on identifying the user via the phone number or the loyalty identifier, a targeted promotion could be displayed via a display frame 129 offering a free item, such as a drink or car wash. More details on the customization of content provided via the display frames will be provided later.

In some implementations, the computing device 110 can also include a communications module 125, such as a wired or wireless transceiver. The wireless transceiver can be a short-range wireless radio transceiver, such as a Bluetooth transceiver. The communication module 125 can be provided at a fuel dispenser 105 located in a region where there is no or limited network connectivity. In this way, the communication module 125 can exchange data with one or more computing devices which may be in proximity of the fuel dispenser 105, such as a computing device of a user who is operating the fuel dispenser 105 to fuel a vehicle.

In some implementations, as shown in FIG. 1, the system 100 can include a computing device 130, such as a mobile phone or internet enables computing device, that can be associated with, correspond to, or in possession of a user of the fuel dispenser 105. The computing device 130 can include at least one data processor 135 configured to perform one or more aspects of the functionality described herein, and a memory 140 for storing one or more applications 142. In some embodiments, the applications 142 can correspond to or be additional instances of the applications 124 displayed via the display frames 129. In some embodiments, the instances of the applications 142 can be provided as web apps and may not be stored in the memory 140. As such, a user may not need to have an installed instance of application 142 on the computing device 130. Instead, the instance of the application 142 can be initiated by selecting a URL provided via an SMS message. Upon selection, the application 142 can execute on the computing device 130 from a file location associated with the API URL in the configuration file 172.

The computing device 130 can also include a screen or display 145 that is in operable communication with the at least one data processor 135 and that is configured to present electronic media or similar executable content to the user of the computing device 130. In some implementations, the computing device 130 can include one or more input device 147, such as an alpha-numeric keypad or a microphone that can be used to provide inputs to the computing device 130. The computing device 130 can further include communication transceiver components or functionality to enable the computing device 130 to be in operable communication with the fuel dispenser 105.

As shown in FIG. 1, in some implementations, the system 100 can include a first server 155 that is remote from the fuel dispenser 105 and configured to perform operations that can enable one or more aspects of providing content associated with applications 124 via the display frames 129. The server 155 can be coupled to the computing device 130 and/or the computing device 110 via a network 150.

The server 155 can include at least one data processor 160 configured to perform one or more aspects of the functionality described herein, and memory 165 for storing instructions for performing one or more aspects of the functionality described herein. The memory 165 can also store one or more configuration files 170 associated with the one or more applications 124. The configuration file 170 can include parameters associated with providing instances of the applications 124 for display via the display frames 129. The server 155 can exchange data with a media gateway device 175 that can be communicatively coupled to the fuel dispenser 105 so as to provide media to the computing device 110 for display via the display frames 129. In some embodiments, the server 155 can be associated with an operator of the fuel dispenser 105 and the fueling environment 107.

As explained in further detail below, the server 155 can include several modules 172 or programs of computer executable instructions performing one or more aspects of the subject matter described herein using the at least one data processor 160. For example, in some implementations, the modules 172 can include an authorization module. The authorization module can receive data from the computing device 130 associated with a fuel dispenser user and can determine if the fuel dispenser user (and the computing device 130) represent a valid and approved user of the system 100 that has permission to operate the fuel dispenser 105. In this way, the authorization module can initiate a fuel sale transaction. The authorization module can also be configured to generate authorization data values that can be provided to the fuel dispenser via the computing device 130 and/or the media gateway device 175. The authorization data values can be used to authorize the fuel dispenser user based on data received from the computing devices 110 or 130. In some embodiments, the authorization module can determine if a user is associated with a loyalty program associated with the fueling environment 107 based on loyalty identifier data provided by the user.

In some implementations, authorization data can include information about the fuel dispenser user that can be used to identify the fuel dispenser user and/or characteristics of the fuel dispenser user. For example, in some implementations, the authorization data can include image data acquired by an image sensor coupled to the fuel dispenser 105 that characterizes an image of the fuel dispenser user and/or the vehicle of the fuel dispenser user, and the identity of the fuel dispenser user can be determined by the authorization module from the acquired image data using conventional image techniques (e.g., facial recognition, vehicle license plate number detection, and the like). In some implementations, the authorization module can determine one or more demographic features of the fuel dispenser user (e.g., age, weight, height, disability status, and the like.) In some implementations, the authorization data can include wireless emission data acquired by a wireless transceiver coupled to the fuel dispenser 105 that characterize the wireless emissions of one or more devices associated with the fuel dispenser user (e.g., mobile computing device, wearable computing device, a dedicated multi-factor authentication device etc.), and the identity of the fuel dispenser user can be determined by the authorization from the acquired wireless emissions data present in the authorization data.

The modules 172 can also include a finance module. The finance module can store transaction data associated with operation of the fuel dispenser 105. For example, the finance module can receive sale or transaction data from the computing devices 110, 130 associated with operation of the fuel dispenser 105. The finance module can also store fuel price data that can be transmitted to the computing devices 110, 130 in regard to a transaction or operation of the fuel dispenser 105. In some embodiments, the finance module can store fuel volume and fuel sale data associated with a fuel dispenser 105. The fuel volume and fuel sale data can include non-resettable tallies indicating cumulative, up-to-date, total volumes and total sales amounts of fuel dispensed from the fuel dispenser 150.

The modules 172 can also include a dispenser data module. The dispenser data module can implement functionality and transmit, receive, or store dispenser data associated with operation of the fuel dispenser 105, such as fuel dispenser state data. For example, the dispenser data can include amounts of fuel dispensed in a single dispensing operation (e.g., a single transaction), dispensing operations for a day, dispensing operations for a week, dispensing operations for a month, or the like. The dispenser data can include numbers of dispensing operations, timing of individual dispensing operations, or diagnostic data associated with operation of the fuel dispenser 105. The diagnostic data can include error or warning codes generated in response to operation or non-operation of the fuel dispenser 105. For example, the dispenser data can include indications of network connectivity available or lost at the fuel dispenser 105. In some embodiments, the dispenser data module can also include fuel volume and fuel sale data associated with the fuel dispenser 105. The fuel volume and fuel sale data can include non-resettable tallies indicating cumulative, up-to-date, total volumes and total sales amounts of fuel dispensed from the fuel dispenser 105.

The system 100 can also include a second server 180. The server 180 can be associated with the applications 124, 142. The server 180 can include a data processor 182 and a memory 184 storing application data 186, which can correspond to instances of the applications 124, 142. The memory 184 can also store authentication credentials included in the application data 186 which can be used to verify the identity of the user while using either of applications 124 at the fuel dispenser 105 or applications 142 on the users computing device 130.

The instances of the applications 124, 142 can include application data that is updated based on inputs or selections provided by a user via the display frames 129. The instances of the applications 124, for example, can be provided to the computing device 110 via an application programming interface (API) uniform resource locator (URL) that is specified in the configuration file 170 and associated with a respective application 124 and/or 142. The instances of the applications 124 can be provided for display at the fuel dispenser 105 via the display frames 129 responsive to parameters identified in the configuration file 170. The parameters can include a fuel pump ID, a phone number of the user, a loyalty identifier of the user, a digital receipt phone number, and a fuel dispenser state.

As further shown in FIG. 1, the system 100 can also include a kitchen display system (KDS) 188 and a point-of-sale system (POS) 196. The KDS 188 can include a data processor 190 and a memory 192 storing application data 194 corresponding to instances of the applications 124, 142, 186. In some embodiments, one or more of the applications 124, 142 can include a retail purchasing application, such as food ordering application. Responsive to providing the retail purchasing application via a display frame 129 and receiving user inputs selecting one or more items for purchase, application data can be provided to the KDS 188 for order fulfillment. In some embodiments, the user can manipulate the order (e.g., by inputting item level additions or deletions of items from the order) via the display frame 129 or the computing device 130. Once fulfilled, order data associated with the order can be transmitted from the KDS 188 to the POS 196 for purchase by the user associated with the order.

Figure 2:
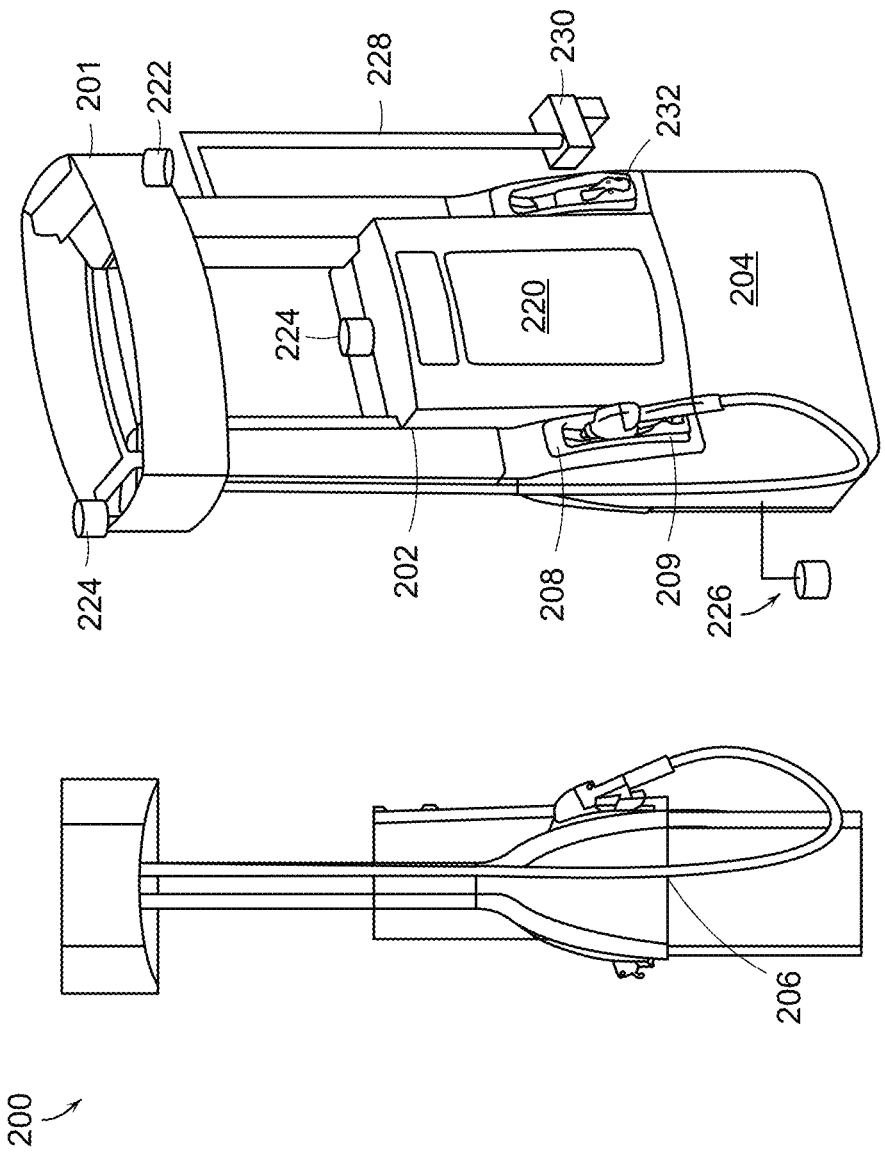
FIG. 2A is a side perspective view of one embodiment of a fuel dispenser.
FIG. 2B is a front perspective view of the fuel dispenser shown in FIG. 2A.
Figure 3:
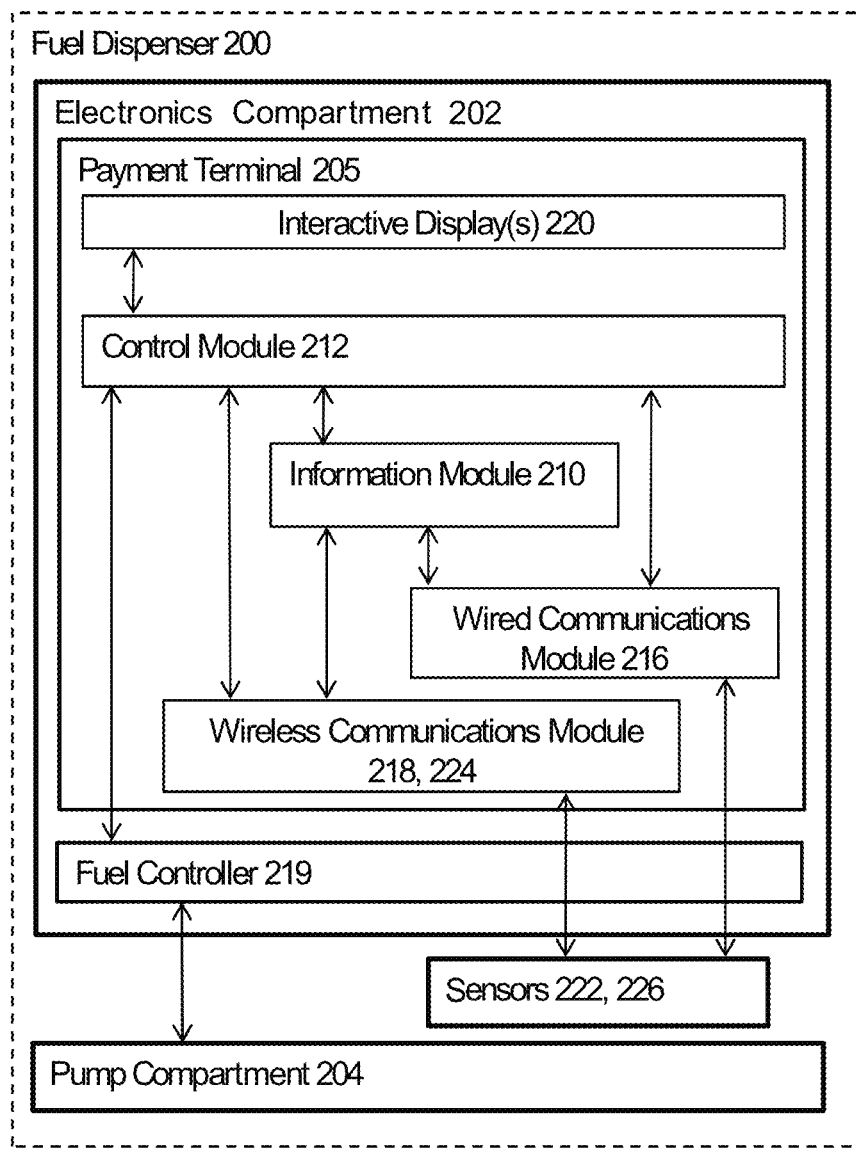
FIG. 3 is a diagram showing internal components of the fuel dispenser of FIGS. 2A and 2B.

FIGS. 2A and 2B illustrate one embodiment of a fuel dispenser 200 that can be used in some implementations of the current subject matter, and FIG. 3 illustrates components of the fuel dispenser. The fuel dispenser 200 and 300 can correspond to the fuel dispenser 105 described in relation to FIG. 1. In general, as shown in FIG. 2, the dispenser 200 includes a dispenser body 201 having an electronics compartment 202, a pump compartment 204, and an image sensor 222. The pump compartment 204 houses a pump configured to pump fuel from a fuel tank or other reservoir, as well as one or more meters that can be configured to monitor fuel flow, flow of fuel additives, and/or flow of other components of the fuel. The pump compartment 204 can also include other components to facilitate fuel dispensing and mixing, such as motors and valves, a strainer/filtering system, a vapor recovery system, and the like. The pump compartment 204 is isolated from the electronics compartment 202 within the dispenser 200 to facilitate safety, security, and/or maintenance, as will be appreciated by a person skilled in the art. Fuel is thus not allowed to flow from the pump compartment 204 to the electronics compartment 202 and instead flows from the pump compartment 204 through hose 206 to a nozzle 208 for dispensing. As will be appreciated by a person skilled in the art, the nozzles 208 are each configured to dispense fuel from the dispenser 200 as pumped therefrom by the pump. The dispenser 200 also includes a nozzle receptacle 209 configured to store the nozzle 208 when not in use.

The dispenser 200 can also include a wireless transceiver 224 positioned on the electronics compartment 202 or elsewhere on the dispenser 200, such as on the dispenser body 201. The wireless transceiver 224 can be communicably coupled to the communications module 125. In some embodiments, the wireless transceiver 224 can be a Bluetooth wireless transceiver configured to exchange data with a computing device via short-range radio signals. In some embodiments, one or more sensors 226 can be coupled to the dispenser 200. For example, one or more sensors 226 can be configured in fuel tanks suppling fuel to the dispenser 200. The sensors 226 can include wired and wireless sensors.

In some implementations, the dispenser 200 can be configured to dispense electricity and can include several components for dispensing the electricity. For example, dispenser 200 can include a charging cable 228 coupled to the dispenser body 201 at one end and configured to deliver electricity to a charging connector 230 coupled to an opposite end. The charging connector 230 can be configured to couple to a charging port of a vehicle (not shown) and to deliver the electricity provided by the dispenser 200, via the charging cable 228, to the vehicle when coupled to the charging port. When not in use, the charging connector 230 can be stored in a charger receptacle 232 formed on the dispenser body 201.

In some embodiments, the dispenser 200 can include dispensers configured to dispense other types of "fuel" besides a petroleum fuel. For example, the dispenser 200 can be configured to dispense electricity, such as a vehicle charging station, or a gas, such as a dispenser configured to dispense hydrogen, liquid propane gas (LPG) or compressed natural gas (CNG), water, or the like. It will be understood that the fueling environment 107 and the dispensers 200 described herein are not limited to petroleum gasoline in liquid format and that other types of dispensers configured to dispense alternate types of "fuel" can be envisioned. In some embodiments, the dispenser 200 can be an electrical fuel dispenser. In some embodiments, the dispenser 200 can be a hydrogen fuel dispenser. In some embodiments, the dispenser 200 can be a natural gas fuel dispenser.

As shown in FIG. 3, the electronics compartment 202 houses electronics for displaying remote content via the display 220, facilitating payment for fuel, and for controlling operation of the fuel dispenser to facilitating the dispensing of the fuel. For example, the electronics compartment 202 can include a fuel controller 219 that, at least in some implementations, includes a data processor, memory, and storage forming part of at least one computing system. The fuel controller 219 is configured to control dispensing of the fuel from the pump compartment 204. The electronics compartment 202 also includes a payment terminal 205 that is configured to provide a user with one or more options to create a desired fuel mixture, receive instructions characterizing the desired fuel mixture, receive payment information and/or user identification information from a user, transmit and receive the payment information and/or the user identification information with a POS system, and deliver fueling instructions to the fuel controller 219 to dispense fuel. The payment terminal 205 can also be configured to provide a user with information related to a status of fueling. For example, the payment terminal can display an amount of fuel that has been dispensed, and a corresponding fuel cost as the fuel mixture is dispensed.

The payment terminal 205 can be configured to facilitate communication between a user and the fuel controller 219, and can include an interactive display 220 and an information module 210. The information module 210 can, at least in some implementations include a data processor, memory, and storage, forming part of at least one computing system. The payment terminal 205 can also include one or more wired communication modules 216 and/or wireless communication modules 218 and a control module 212 that, at least in some implementations includes a data processor, memory, and storage, forming part of at least one computing system. The communication modules 216, 218 can function to allow data to be transmitted to and from various components within the payment terminal 205 via wired and/or wireless communication, respectively. For example, the communication modules 216, 218 can be configured to transmit and receive signals that can characterize, e.g., payment information, user identification information, and/or information regarding a desired fuel selection, via wired and/or wireless communications, respectively. The wireless communication module 218 can include, e.g., a transceiver for communicating via Bluetooth protocol (e.g., wireless transceiver 224), cellular protocol, WI-FI protocol, near field communication (NFC), and/or a radio frequency identification (RFID) protocol. Wired and/or wireless communication via the communication modules 216, 218 can be according to any of a variety of communication protocols, e.g., TCP/IP, etc., as will be appreciated by a person skilled in the art. The communication modules 216, 218 are also in operable communication with the image sensor 222 and are configured to receive image data acquired by the image sensor 222. The communication modules 216, 218 can additionally transmit the received image data for further external processing as described elsewhere herein.

The interactive display 220, which can be, or can include, a touchscreen and can correspond to the display 122 including the UI 127 and display frames 129 provided within the UI 127. The interactive display 220 can be operably coupled to the control module 212 which can be used to control, dynamically rearrange, and/or update the UI 127 rendered on the display 220. For example, the control module 212 can control display of the one or more display frames 129 within the UI 127. The display 220 can be configured to show information (e.g., applications (such as applications 124), media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 212 to be processed. Some examples of information that the display 220 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select. The control module 212 can be further configured to receive from and/or control the one or more sensors 226.

To facilitate payment, the information module 210 can be configured to receive input such as, e.g., user identification information and/or payment information, and deliver the information to the control module 212. For example, the information module 210 can include a barcode and/or QR code scanner, and/or a NFC contactless card reader for receiving payment information and/or user identification information.

In some embodiments, the information module 210 be operably coupled to the image sensor 222 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 210 can include a palm reader and or/fingerprint reader which can scan a palm and/or finger of the user to obtain user identification information. In some embodiments, the user identification information can be associated with a loyalty rewards identifier automatically. Accordingly, in some embodiments, a pre-determined payment method, display of instances of applications 124 within display frames 129, and/or user preferences, can be determined based on user identification information.

As shown in FIG. 3, the information module 210 can be operably coupled to the wired communication module 216 and/or the wireless communication module 218. The wired and wireless communication modules 216, 218 can allow the information module 210 to send and receive application data associated with the applications 124, payment information, loyalty identifier data, and/or user identification information to and from a mobile device such as a smart phone, tablet, laptop, and the like, that is in electronic communication with the information module 210 via the wired and/or wireless communication modules 216, 218. For example, application data, such as an instance of one of the applications 124 displayed via one of the display frames 129 can be provided to a computing device 130 of a user of the fuel dispenser 105 via the wireless communications modules 216, 218. In this way, a session of an application 124 displayed via the display frame 129 can be transmitted to the computing device 130 such that the user can continue the same session or start a new session of the application 124 on the computing device 130. In some embodiments, the second or new session of the application 124 can be received by the computing device 130 from the server 180.

Although the wireless communication module 218 is shown to be located within the payment terminal, the wireless communication module 218 can be located elsewhere on, within, or in the vicinity of, the fuel dispenser 200. For example, the wireless communication module 218 can be mounted on top of the fuel dispenser, which can facilitate retrofitting the wireless communication module 218 to existing fuel dispensers and/or facilitate repair, upgrade, or other maintenance of the communication module 218, as described in U.S. patent application Ser. No. 15/182,201 filed on Jun. 14, 2016 and entitled "Methods and Devices for Fuel Dispenser Electronic Communication," and incorporated by reference herein.

Figure 4:
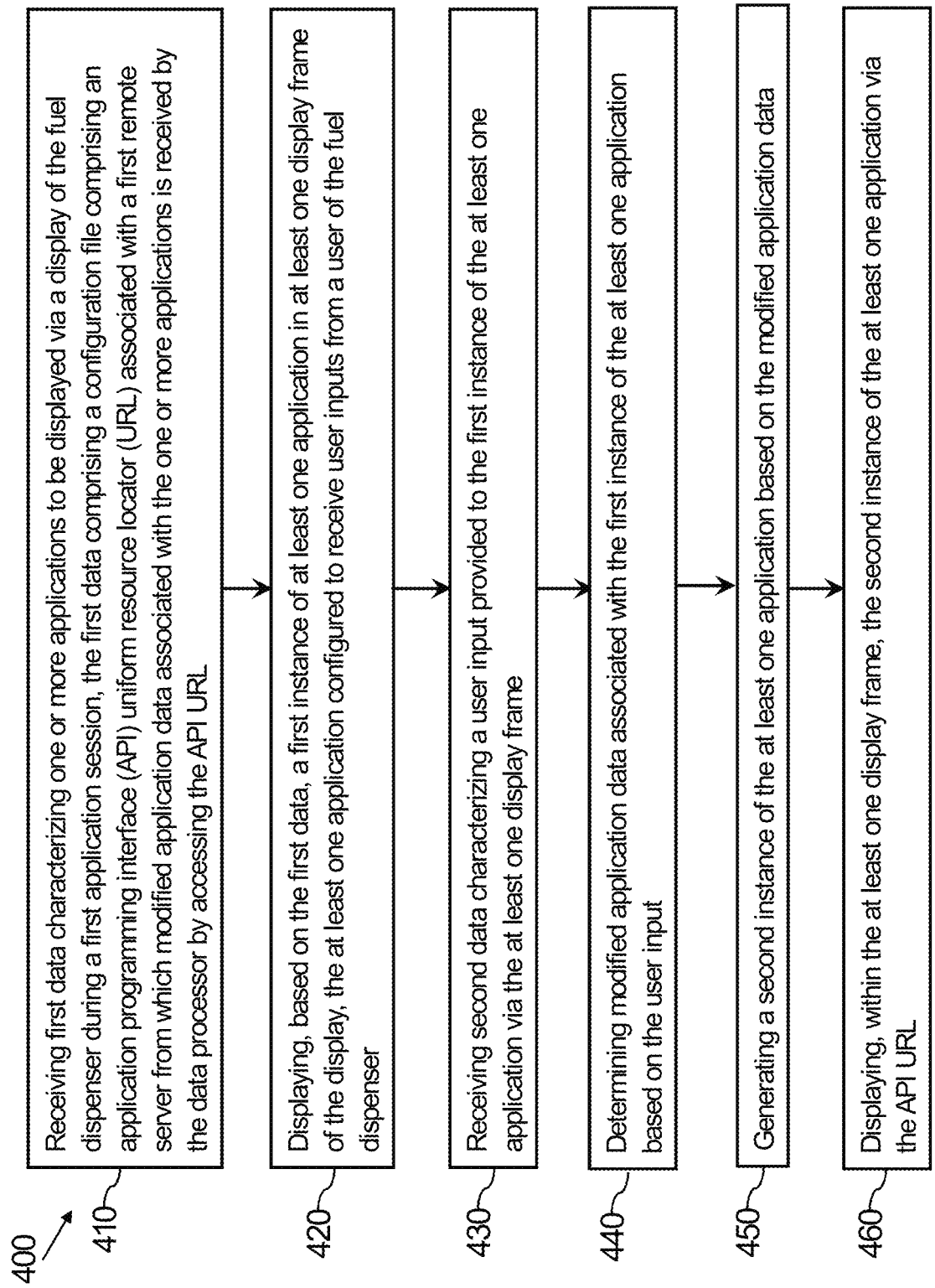
FIG. 4 is a process flow diagram illustrating an example process of some implementations of the current subject matter that can provide for provision of remote content via a fuel dispenser in a first application session.

FIG. 4 is a process flow diagram illustrating an example process 400 of some implementations of the current subject matter that can provide remote content for display within a display frame of a fuel dispenser. The process 400 can be performed by one or more components of the system 100 described in relation to FIG. 1. As used herein, the term "instance" of an application can correspond to a unique presentation of an application 124, 186 within a display frame 129 or within the UI 127. Thus, a first instance, may be for example, a display requesting a user to input a phone number or a loyalty identifier. Responsive to transmitting, the input data, the data processor 115 can determine and provide a second instance of the application 124, 186 confirming an identity of the user associated with the input data. An application can be configured to provide one or more instances in a "session" of an application. The term "session" of an application can be associated with a specific task, workflow, user-interaction, or computing device. For example, a first session of an application 124 can be initiated via content provided via a display frame 129 displayed on the fuel dispenser display 122. Responsive to providing user data, such as a phone number or a loyalty identifier, a second session of the application 124 can be instantiated on a different computing device, such as the computing device 130 (e.g., as application 142) or the server 188 (e.g., as application 194). In some embodiments, the transition between a first application session and a second application session can be enabled by providing the user with an SMS message providing executable content, such as a URL to access the second session of the application on their computing device 130 at which the SMS message was received. In some embodiments, the second session of the application can be accessed on the computing device 130 as application 142 without requiring an SMS text message to be provided to the computing device 130. In some embodiments, the second session of the application 124 can be initiated via a QR code displayed within one of the display frames 129. In this way, a user can scan the displayed OR code and can initiate the second session of the application 124 on their computing device 130, for example as an instance of application 142.

At 410, data processor 115 can receive first data associated with one or more applications 124, 186 to be displayed via display 122 of the fuel dispenser 105 during a first application session. The first data can include a configuration file 170 that can include a URL identifying a file location of the applications 124, 186 as well as an API URL associated with a remote server, such as remote server 180. The configuration file can identify a file location from which modified application data associated with the applications 124, 186 that can be accessed via the API URL and subsequently received by the data processor 115 for display. In some embodiments, instances of the applications 124 can be stored locally, such in the memory 120 of the computing device 110. In some embodiments, instances of the applications 124 can be stored remotely, such as in the memory of the server 180 as instances of the applications 186 which can correspond to the instances 124 provided for display at the fuel dispenser 105. The modified application data can include instances of the applications 124, 186 which are provided in response to a previous user input or event data associated with the fuel dispenser 105. The data processor 115 can receive the first data from the server 155. In this way, the data processor 115 can configure content associated with the applications 124, 186 for display within one or more display frames 129 that are provided within the display 122 of the fuel dispenser 105.

The configuration file 172 can include plurality of parameters associated with displaying instances of the application 124 within a display frame 129 provided in the UI 127 of the display 122. The parameters can include a fuel pump ID identifying a particular fuel dispenser 105, a phone number of the user, a loyalty identifier of the user, a digital receipt phone number, and a fuel dispenser state associated with an operating state of the fuel dispenser 105. The fuel dispenser state data can include a payment state, a fueling state, or an idle state.

At 420, a first instance of application 124 can be provided for display in display frame 129 of the display 122 based on the first data received at 410. The application 124 can be configured to receive user inputs from a user of the fuel dispenser 105 via the display frames 129. Aspects of displaying the display frame 129 in the UI 127 can be specified in the configuration file 172. For example, the configuration file 172 can identify a location, order, display frame size, volume, closed captioning display, or the like.

At 430, the data processor 115, can receive second data characterizing a user input provided to the first instance of the application 124 via the display frame 129.

At 440, the data processor 115, can determine modified application data associated with the first instance of the application 124 based on the user input. For example, the modified application data can be used to determine a next instance of the application 124 to be displayed via the display frame 129 base on the provided user inputs associated with the second data. For example, responsive to the second data, the data processor 115 can determine the modified application data based on event data such as a display size change, a language change, a display contrast change, a volume change, or a fuel dispenser state change. For example, responsive to receiving a second input muting a volume of audio associated with an application 124 displayed and executing in display frame 129, the data processor 115 can determine modified application data indicating the application 124 has been muted. Additional event data can be correspond to other aspects of the visual display of the application 124 within the display frame 129, such display size, language, displayed contrast of the display 122, or language changes.

In some embodiments, event data associated with a state change of the fuel dispenser 105 can be further used to determine the modified application data. For example, if a user has finished dispensing fuel and has returned the nozzle 208 to the nozzle receptacle 209, the control module 212 (and/or the fuel controller 219) can be configured to generate event data to indicate that the state of the fuel dispenser 105 has changed and the fuel dispenser 105 is now in an idle state. Based on that event data, the modified application data can be used to generate a next instance of the application 124 provided via the display frame 129.

Figure 5:
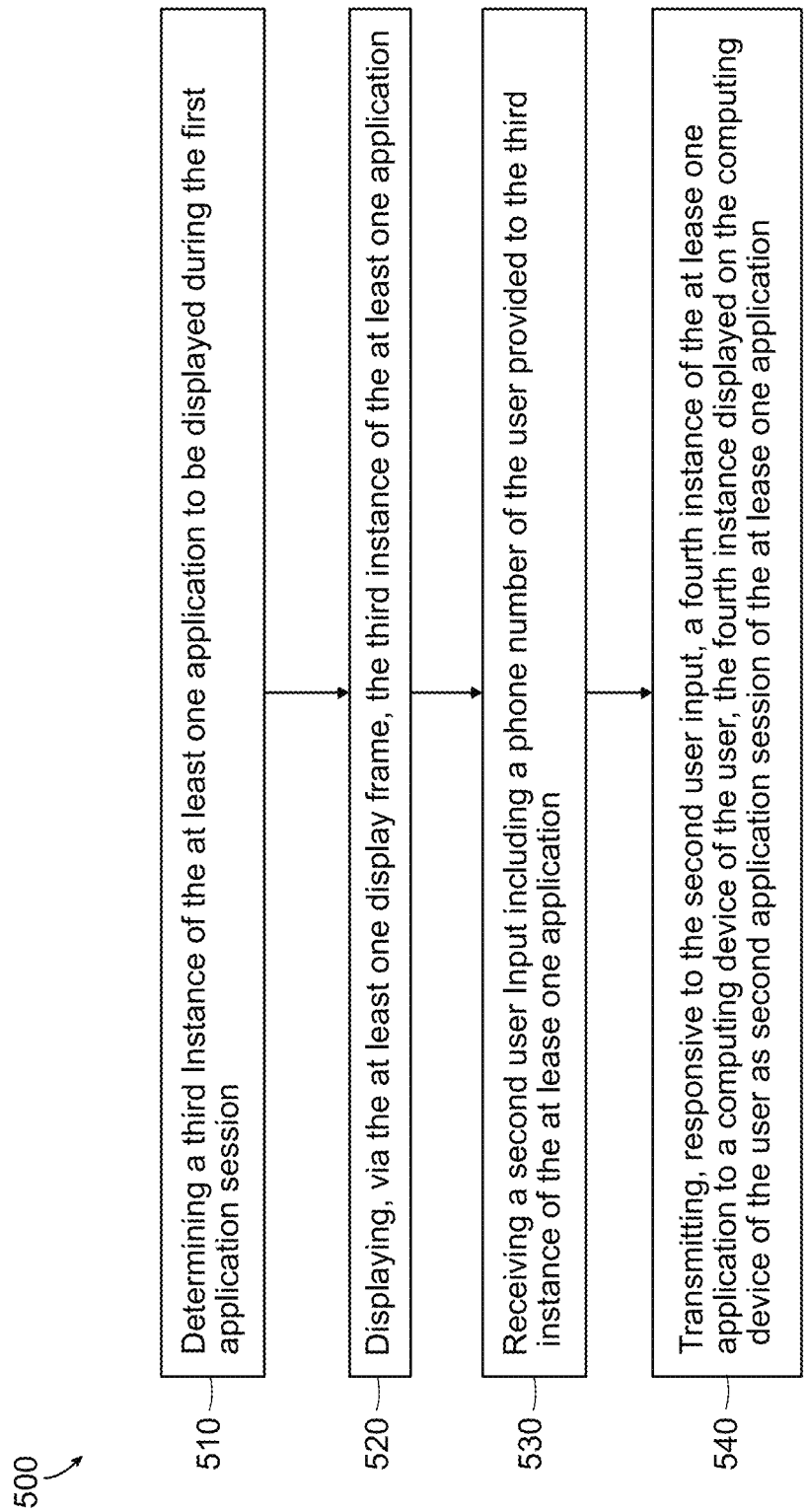
FIG. 5 is a process flow diagram illustrating an example process of some implementations of the current subject matter that can provide for transitioning the provision of remote content displayed on a fuel dispenser in a display frame as first application session to a computing device of a user of the fuel dispenser as a second application session.

Continuing this example related to event data generated in regard to changes in the fuel dispenser state, the data processor 115 can be configured to perform the process 500 as shown in FIG. 5. For example, at 510, responsive to generating the fuel dispenser state change event data during the first session of the application 124 (e.g., returning the nozzle 208 to the nozzle receptacle 209 to cause the fuel dispenser to be in an idle state), the data processor 115 can determine a third instance of the application 124 during the first application session. At 520, the third instance can be displayed via the display frame 129. In this way, the data processor 115 can determine that fueling is complete and may generate and display the third instance of the application 124 to be provided to the user via the display frame 129. For example, in the third instance of the application 124, the user could be prompted to provide a phone number to continue the first application as a second application session on a computing device 130 associated with the phone number. In some embodiments, the third instance cold be provided to request input of a loyalty identifier and responsive to providing that data, a next instance of the application 124 could display available rewards points or a promotional offer associated with a loyalty program.

At 530, the data processor 115 can receive a second user input including a phone number of the user that can be provided to the third instance of the application 124 as described above. At 540, responsive to receiving the second user input, the data processor 115 can determine and cause a fourth instance of the application 124 to be transmitted to the computing device 130 associated with the phone number provided in the second user input. The fourth instance of the application can then be displayed on a display 140 of the computing device 130 as a fourth instance of application 142 (which can correspond to applications 124 and 186) as a second application session. The second application session can be a continuation of the first application session initiated at the display frame 129 of displayed on the display 122 of the fuel dispenser 105.

In some embodiments, the application 124 can include a retail purchasing application 124, such a food delivery application and the user of the fuel dispenser 105 can be presented with the food delivery application in the display frame 129 of the display 122 as a first or subsequent instance of the application 124. The food delivery application can include an order of items or services provided for selection in instances of the food delivery application. The order can reflect items or services selected by the user during an instance of the food delivery application 124 displayed within the display frame 129. The order can be transmitted to a server, such as the server 180 which can include the food delivery application as an application 186 (which can correspond to the application 124 displayed via the display frame 129). The server 180 can be configured to transmit the order to a KDS 188 as shown in FIG. 1. The KDS 188 can also include instances of the food delivery application, shown as applications 194 in FIG. 1. The KDS 188 can be provided at a physical facility in which the order can be fulfilled.

Figure 6:
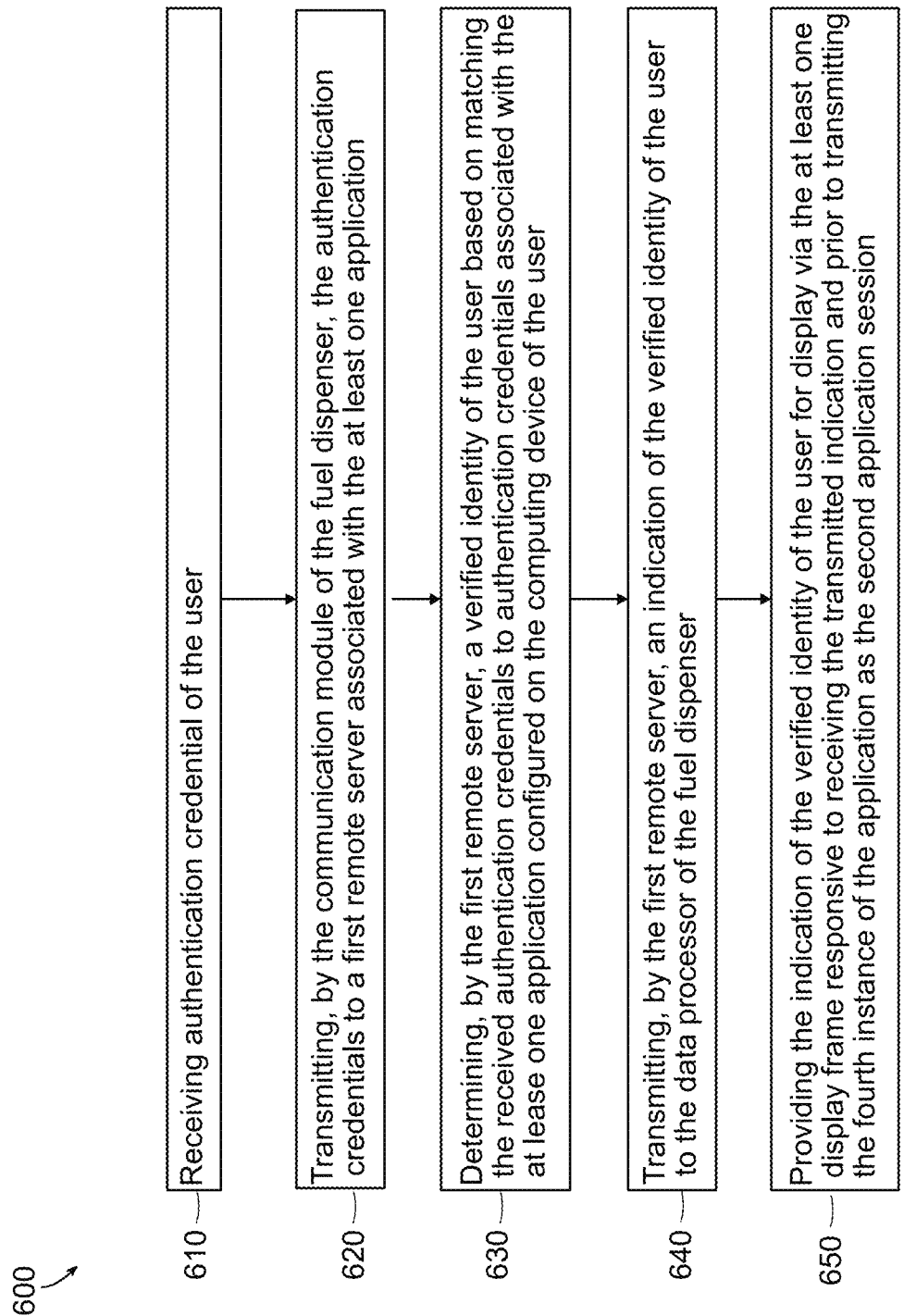
FIG. 6 is a process flow diagram illustrating an example process of some implementations of the current subject matter that can provide for verifying an identity of a user of the fuel dispenser during provision of remote content via the fuel dispenser.

In some embodiments, an instance of the application 124 can include an authentication challenge displayed via the display frame 129. An authentication challenge can be provided to verify the identity of a user of the fuel dispenser 105. In some embodiments, the authentication challenge can be displayed in regard fuel payment, operation of the fuel dispenser 105, or authentication in regard to a loyalty program. As shown in FIG. 6, the process 600 can describe a method performed by the data processor 115 to verify an identity of a user of the fuel pump 105. At 610, in an instance of the application 124, such as the third instance described above in regard to event data indicating a change in state of the fuel dispenser 105, the data processor 115 can receive authentication credentials of the user via the application 124 displayed in the display frame 124. In some embodiments, the authentication credentials can be received via a different display frame 129 of the UI 127. In some embodiments, the authentication credentials can include a phone number, loyalty identifier, a personal identifier or PIN, or the like. At 620, the data processor 115 can cause the communications module 125 to transmit the authentication credentials to a remote server associated with the application 124, such as remote server 180. The remote server 180 can determine, at 630, a verified identity of the user based on matching the received authentication credentials to authentication credentials configured on the computing device 130 of the user and included in the application data 186 stored in the memory 184 of the remote server 180. At 640, the remote server 180 can transmit an indication of the verified identity of the user to the data processor 115 and at 650, the data processor 115 can cause the indication of the verified identity of the user to be displayed via the display frame 129. The indication can be displayed prior to transmitting a next instance of the application 124 to the computing device 130 of the user to be displayed via display 140 as an instance of application 142 in a second application session. In this way, the system can verify the identity of the user before transitioning the application session from the display frame 129 of the fuel dispenser 105 to the display 140 of the user's computing device 130.

Returning now to FIG. 4 and continuing the process 400 from which modified application data was determined at 440 based on user input and event data associated with a change in the fuel dispenser state, a second instance of the application 124 can be generated by the data processor 115 based on the modified application data at 450. The second instance of the application 124 can therefore be contextually relevant to the user inputs and/or the modified application data or event data associated with the fuel dispenser 105.

At 460, the second instance of the application 124 can be provided for display within the display frame 120 via the API URL specified in the configuration file 172. By providing updated instances of the application 124 via the API URL identified in the configuration file 172, the system 100 can advantageously optimize computing resources such that additional memory 120 at the fuel dispenser 105 is not required to host all possible instances of the application 124. The API URL can point to the location of updated instances of the application 124 (e.g., the instances of corresponding application 186 stored in the memory 184 of the server 180) which are updated in response to user inputs and/or modified application data such as event data associated with operation of the display 140 or event data associated with a state of operation of the fuel dispenser 105. The data processor 115 can receive the instances of the updated applications 124 from the remote server 180 by accessing the API URL. This unique architecture can significantly reduce the amount of memory and processing power needed to host applications 124 at the fuel dispenser 105. In addition, the system and methods described herein can enable more robust provision of remote content that is adapted or customized for a particular user of the fuel dispenser 105. In this way, an enhanced user experience is provided for fuel dispenser users as they can transition an application session from the fuel dispenser 105 to their computing device 130 (e.g., a mobile phone or internet-enable smart device) without requiring separate log-ins and maintaining a use context of the application 124 such as when initiating a food order via a food delivery application displayed within a display frame 129 of the fuel dispenser 105 and subsequently transitioning to continue the food order from their computing device 130.

Figure 7:
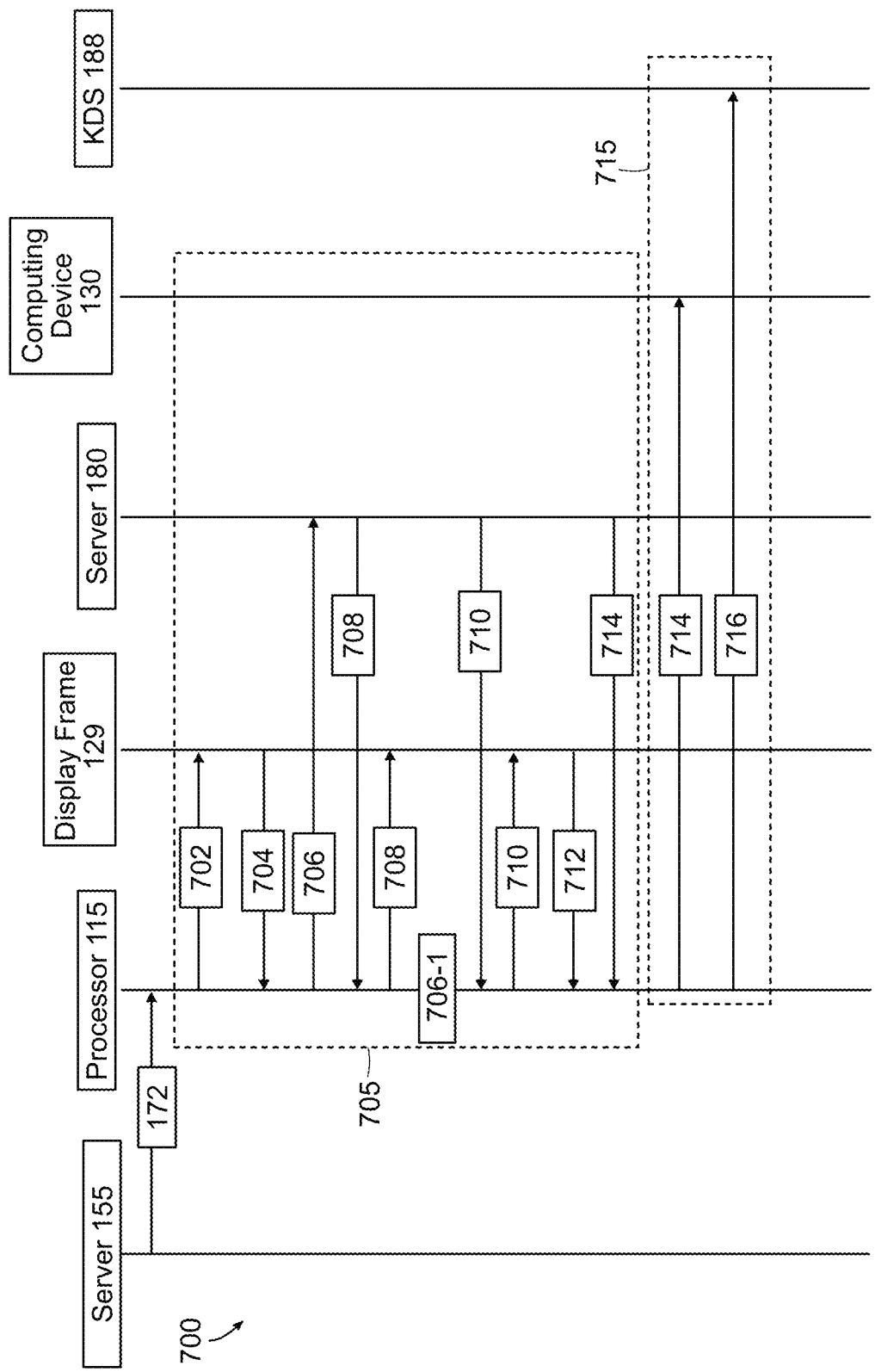
FIG. 7 is a dataflow diagram illustrating an example data flow for providing remote content via a display frame of a fuel dispenser according to some implementations of the subject matter described herein.

FIG. 7 is a dataflow diagram illustrating an exemplary embodiment of a dataflow 700 between components of the system 100 configured to provide remote content via a display frame 129 of a fuel dispenser 105 according to the processes described in relation to FIGS. 4-6. To enable content from a remote server 180 to be provided via a display frame 129 of configured on a display 122 of a fuel dispenser 105, a configuration file 172 can be received from a remote server 155 by a data processor 115 of the fuel dispenser 105. The configuration file can specify a URL associated with a location of an application 186 to be provided as application 124 within the display frame 129. The configuration file 172 can include additional parameters such as a fuel pump ID, a phone number of the user, a loyalty identifier of the user, a digital receipt phone number, and a fuel dispenser state. The configuration file 172 can also include an API URL associated with a location of an application 186 to be provided as application 124 responsive to modified application data.

Responsive to receiving the configuration file 172, the data processor 115 can generate and provide a first instance 702 of application 124 to the display frame 129 for display to a user of the fuel pump 105 in a first application session 705. A user can provide to the first instance of the application 124 via the display frame 129 a user input 704, which can be received by the data processor 115. The data processor 115 can determine modified application data 706 for the first instance 702 of the application 124 based on the user input 704 and/or event data associated with operation of the fuel dispenser 105. In some embodiments, modified application data 706 and the message/event data can be provided to the server 180 via a message/event mechanism, such as a document object model (DOM) mechanism and a second instance 708 of the application 124 can be provided to the data processor 115 based on the modified application data 706 and/or the message/event data received by the server 180. The data processor 115 can then generate a second instance 708 of the application 124 that is updated compared to the first instance 702 based on the modified application data 706. In some embodiments, the second instance 708 of the application 124 can be received from the server 180 based on the location specified via the API URL provided in the configuration file 172. The second instance 708 of the application 124 can be displayed via the display frame 129.

Responsive to receiving modified application data 706-1 associated with a fuel dispenser state change, the data processor 115 can determine a third instance 710 of the application 124. In some embodiments, the third instance 710 can be received from the server 180 based on the location specified via the API URL provided in the configuration file 172. The third instance 710 of the application 124 can be displayed via the display frame 129. The data processor 115 can receive an additional user input including a phone number 712 provided by a user to the third instance 710 of the application 124 displayed in the display frame 129. In some embodiments, the phone number 712 can be a loyalty identifier. In some embodiments, a unique loyalty identifier can be provided in place of the phone number 712. Responsive to receiving the phone number 712, the data processor 115 can cause a fourth instance 714 of the application 124 to be transmitted to the computing device 130 of the user as a second application session 715. In some embodiments, the fourth instance 714 can be received by the from the server 180 based on the location specified via the API URL provided in the configuration file 172.

In some embodiments, the fourth instance 714 can include an order corresponding to items or services provided for selection from the third instance 710 of the application 124 by the user via the display frame 129. The data processor 115 can cause the order 716 to be transmitted to a second server, such as a KDS 188 for fulfillment of the order 716.

Figure 8:
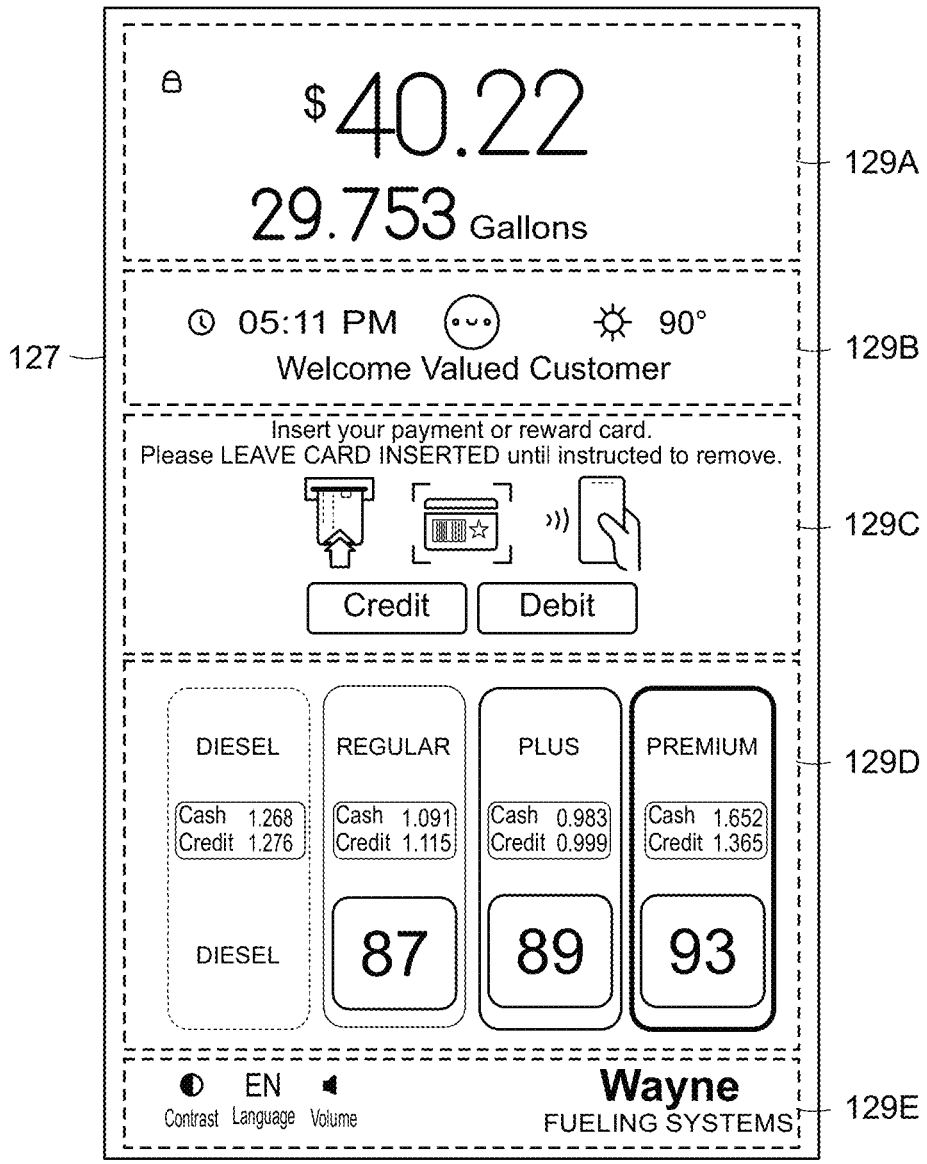
FIG. 8 is an image of an example embodiment of a user interface including display frames for presenting remote content in a display of a fuel dispenser according to some implementations of the subject matter described herein.

FIGS. 8-12B illustrate exemplary embodiments of the user interface 127 provided within the display 122 of the fuel dispenser 105 and within which one or more display frames 129 are configured to provide remote content to a user of the fuel dispenser 105 according to the system and methods described herein. For example, as shown in FIG. 8, the user interface 127 can include display frames 129A-129E. The contents, numbers, size, and relative arrangement of the display frames 129A-129E within the UI 127 can be determined based on parameters included in the configuration file 172. Display frame 129A includes textual data associated with operation of the fuel dispenser 105, such as a cost of the dispensed fuel and a number of gallons of dispensed fuel. Display frame 129B includes a time of day display and a current weather display. Display frame 129C includes payment data associated with operating the fuel dispenser 105, such as selections for payment types and instructions for providing the payment data. Display frame 129D includes graphical elements associated with fuel grade selections. A user can select a desired fuel grade by providing an input to the graphical element. Display frame 129E can include icons associated with user-configurable functionality modifying aspects of the UI 127, such as a contrast of the UI 127, a language of the content displayed in the UI 127, a volume of audio content associated with the applications 124 provided via anyone of the display frames 129. The display frame 129E can also include an icon associated with a brand or an operator of the fuel dispenser 105.

Figure 9:
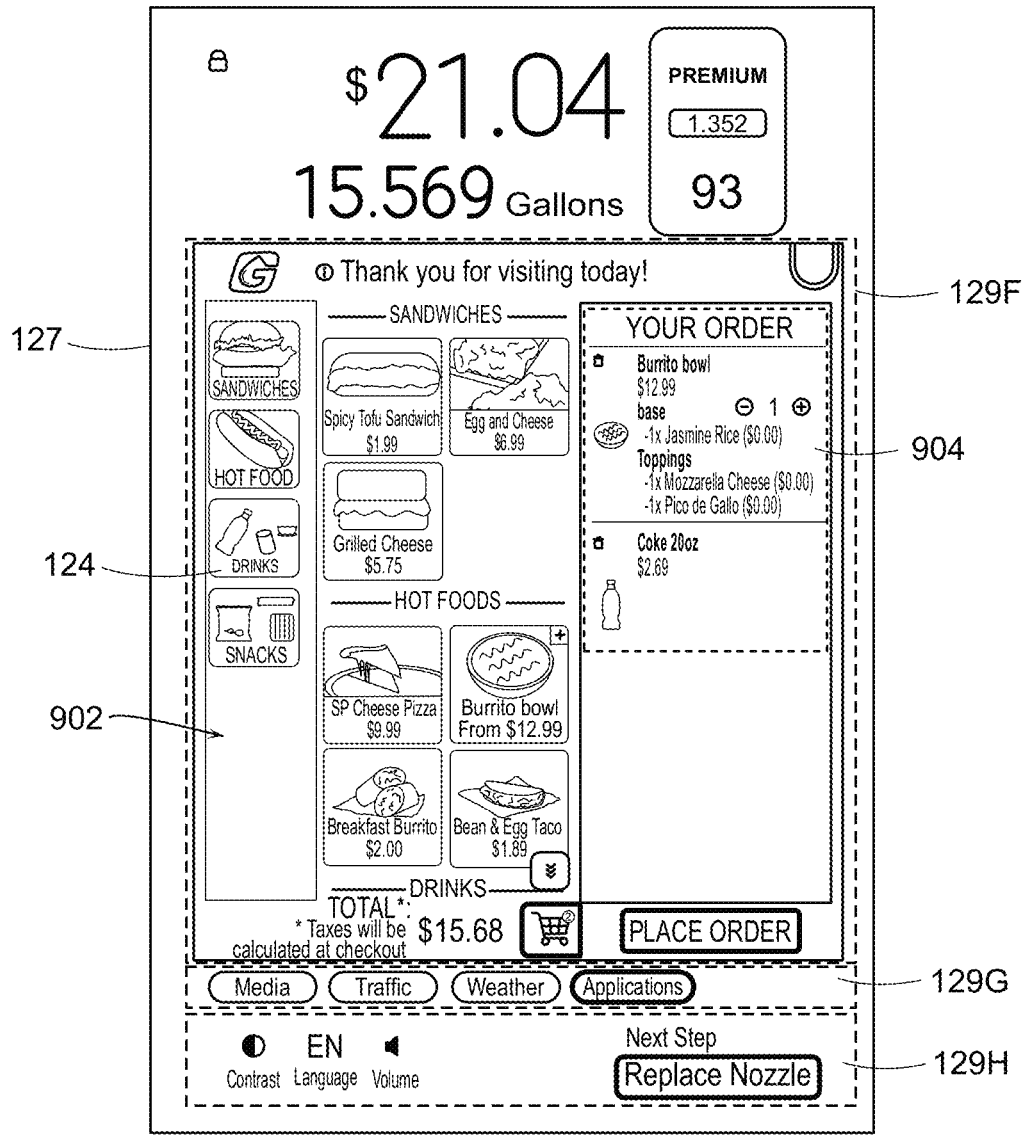
FIG. 9 is an image of an example embodiment of a user interface including a display frame presenting an application displaying items for purchase and an order of selected items in a display of a fuel dispenser according to some implementations of the subject matter described herein.

As shown in FIG. 9, the UI 127 includes display frames 129F-129H. The display frame 129F can include an instance of application 124, such as a food ordering application. The application 124 can provide items 902 that are available for purchase via the application 124. A user can interact with the application 124 via the display frame 129F to select the items 902 for purchase. The application 124 can provide an order 904 within the display frame 129F. The application can also display a total of the order, a cart of selected items, and an icon to place the order 904. The display frame 129G can include icons associated with additional applications 124, such as a media application, a traffic application, and a weather application. The display frame 129G can also an icon associated with a menu of applications 124 that can be configured for display within a display frame 129. For example, responsive to selecting the "Applications" icon in display frame 129G, the food ordering application 124 can be displayed in display frame 129F. The "Applications" icon can be configured to display any number of applications 124 in display frames 129. The applications 124 can correspond to those identified in the configuration file 172 and for which additional application instances are configured within the system 100 on the server 180 (e.g., applications 186), the KDS 188 (e.g., applications 194) and the computing device 130 (e.g., applications 142).

Figure 10:
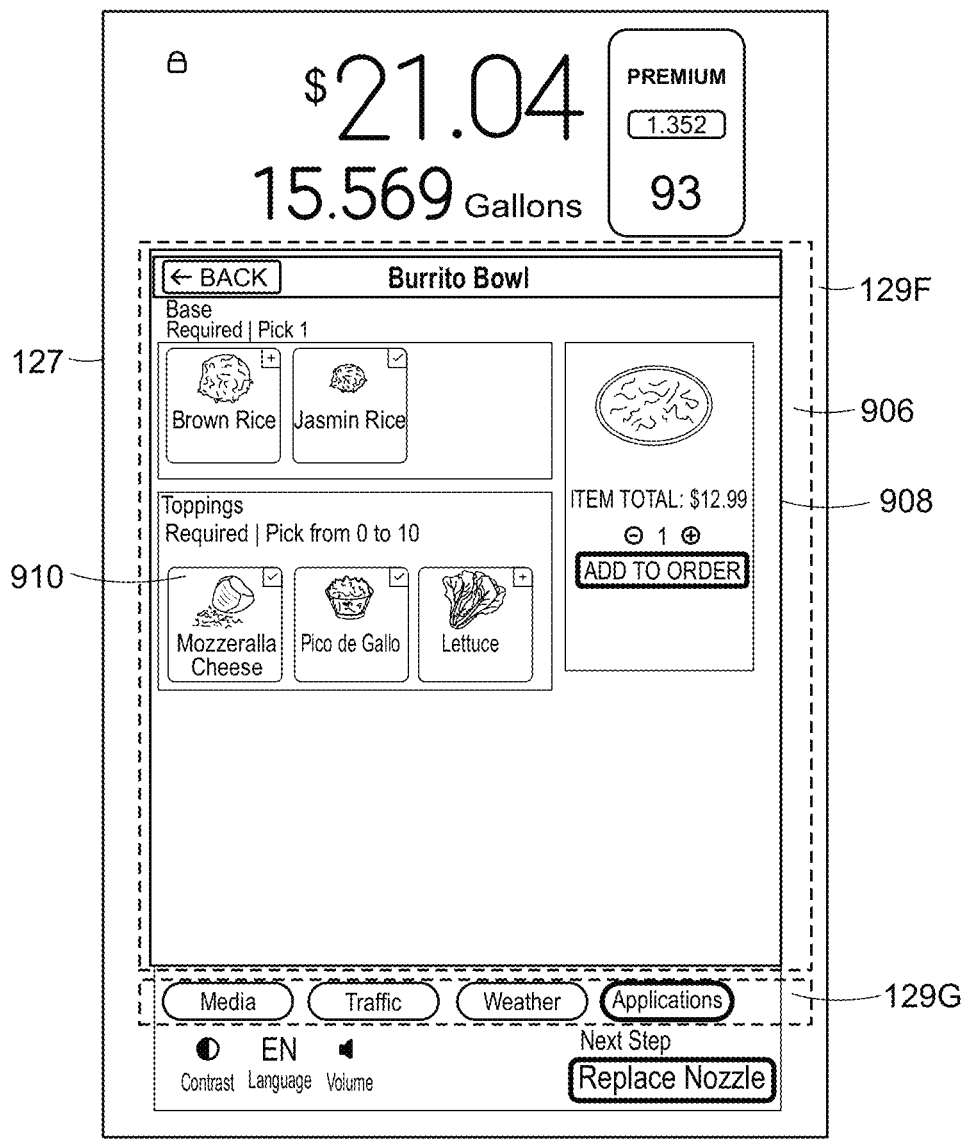
FIG. 10 is an image of an example embodiment of a user interface including a display frame presenting an application displaying item-level order modification in a display of a fuel dispenser according to some implementations of the subject matter described herein.

As shown in FIG. 10, a user can modify an item 902 included in their order 904 within the display frame 129F. Continuing from the order 904 created by the user and shown in FIG. 9, the user can further select an item 902 (e.g., the burrito bowl) and next instance 906 of the application 124 can provide a user interface 908 allowing the user to modify contents of the item. The can provide selections 910 to be added to their item 902.

Figure 11:
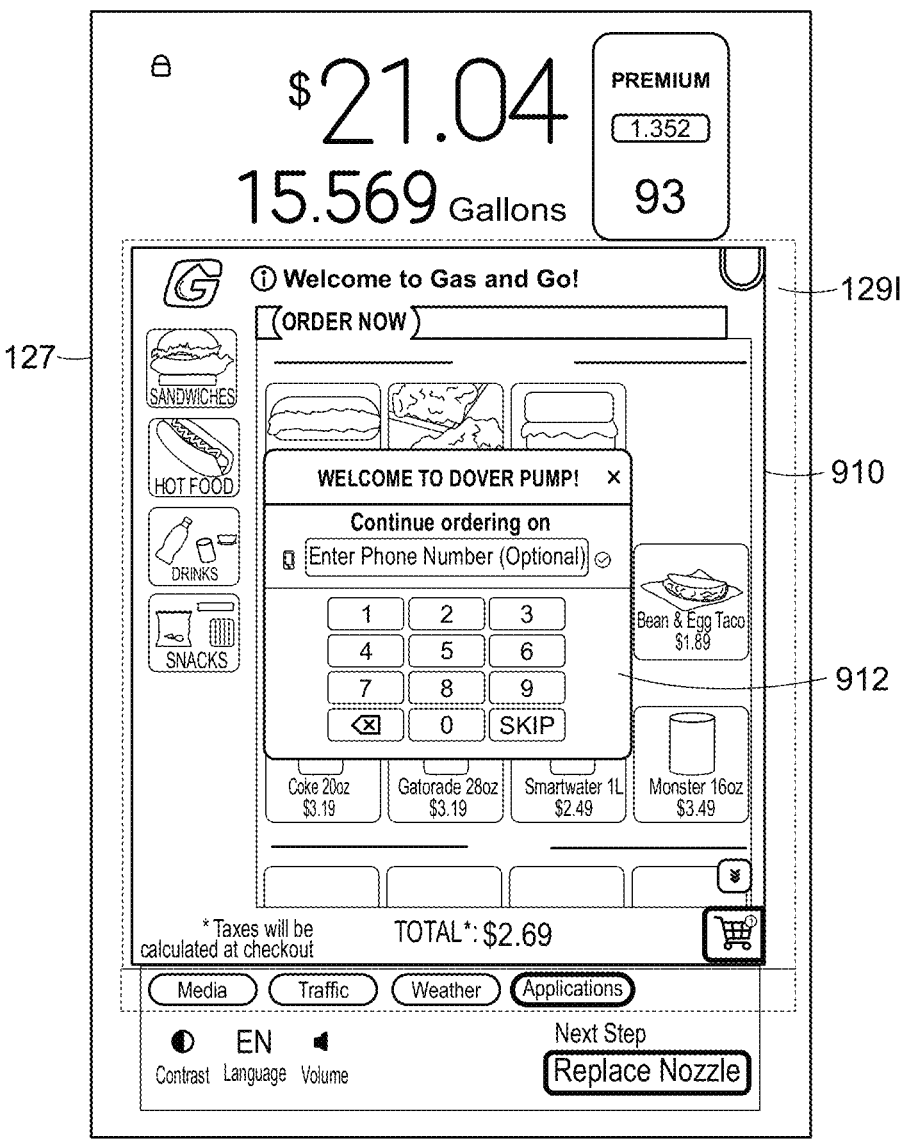
FIG. 11 is an image of an example embodiment of a user interface including a display frame presenting an input screen for a phone number of a user of a fuel dispenser according to some implementations of the subject matter described herein.

As shown in FIG. 11, a next instance 910 of application 124 is displayed in display frame 1291. The next instance 910 can include an input interface 912 configured to receive a phone number of the user. The interface 912 can include a numeric keypad and a display field to view the phone number provided by the user. In some embodiments, the instance 910 can be provided when event data associated with a change in a state of the fuel dispenser 105, such as when the user has finished fueling and replaces the nozzle 208 in the nozzle receptacle 209. In some embodiments, the instance 910 can be displayed in the display frame once a customer selects an item from the application 124 to add to their cart (e.g., as shown and described in relation to FIG. 9). Responsive to providing their phone number, the data processor 115 can generate an SMS message to allow the user to continue their order 904 on an instance of the application 142 provided via their computing device 130. In some embodiments, for privacy purposes, a user can "Skip" input of their phone number, however in such cases, their order will not be conveyed to the instance of application 14 on their computing device.

Figures 12A, 12B:
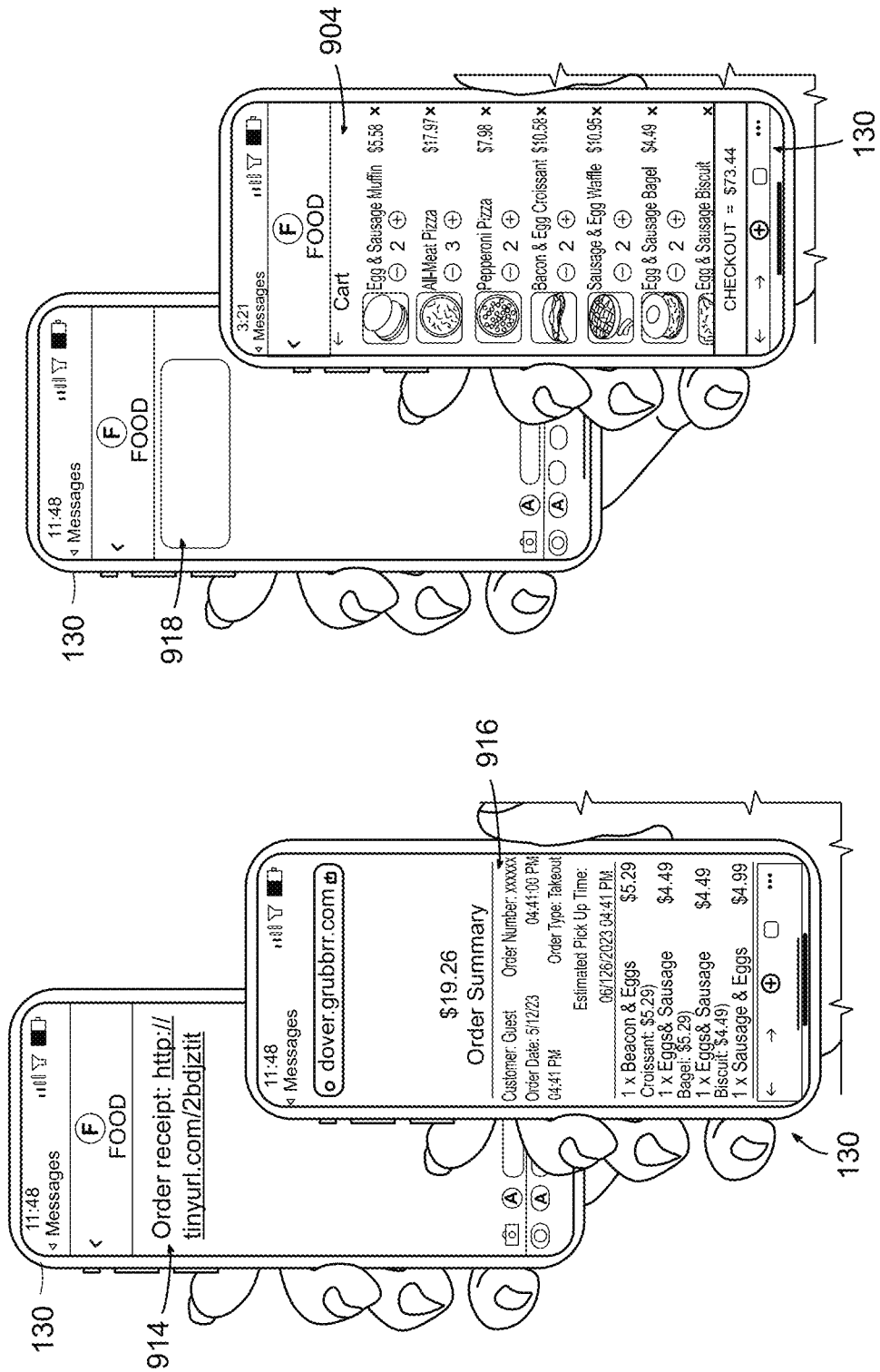
FIG. 12A is an image of an example embodiment of a SMS message and an order receipt displayed on a computing device of a user of a fuel dispenser responsive to providing a phone number associated with the computing device as an input to a display frame of a fuel dispenser according to some implementations of the subject matter described herein.
FIG. 12B is an image of an example embodiment of a SMS message and an order displayed on a computing device of a user of a fuel dispenser responsive to providing a phone number associated with the computing device as an input to a display frame of a fuel dispenser according to some implementations of the subject matter described herein.

As shown in FIG. 12A, responsive to providing a phone number in instance 910 of the application 124 shown in FIG. 11, the data processor 115 can generate an SMS message 914 to be sent to the computing device 130. The user can select executable content of the SMS message to view an order receipt 916 of the order 904 on the computing device 130. The order receipt 916 can be displayed within an instance of application 142 and can provide instructions for the user of the computing device 130 to pick up their order 904. In some embodiments, the user can provide payment information or data via the computing device 130 to purchase items included in the order 904. As shown in FIG. 12B, if a user provided their phone number, as described in relation to FIG. 11 but left the order 904 incomplete or otherwise abandoned the order in the application 124 after the nozzle 208 is returned to the nozzle receptacle 209, an SMS message 918 can be transmitted to the computing device 130. The SMS message can include executable content, which when selected can present the order 904 for purchasing.

Figure 13:
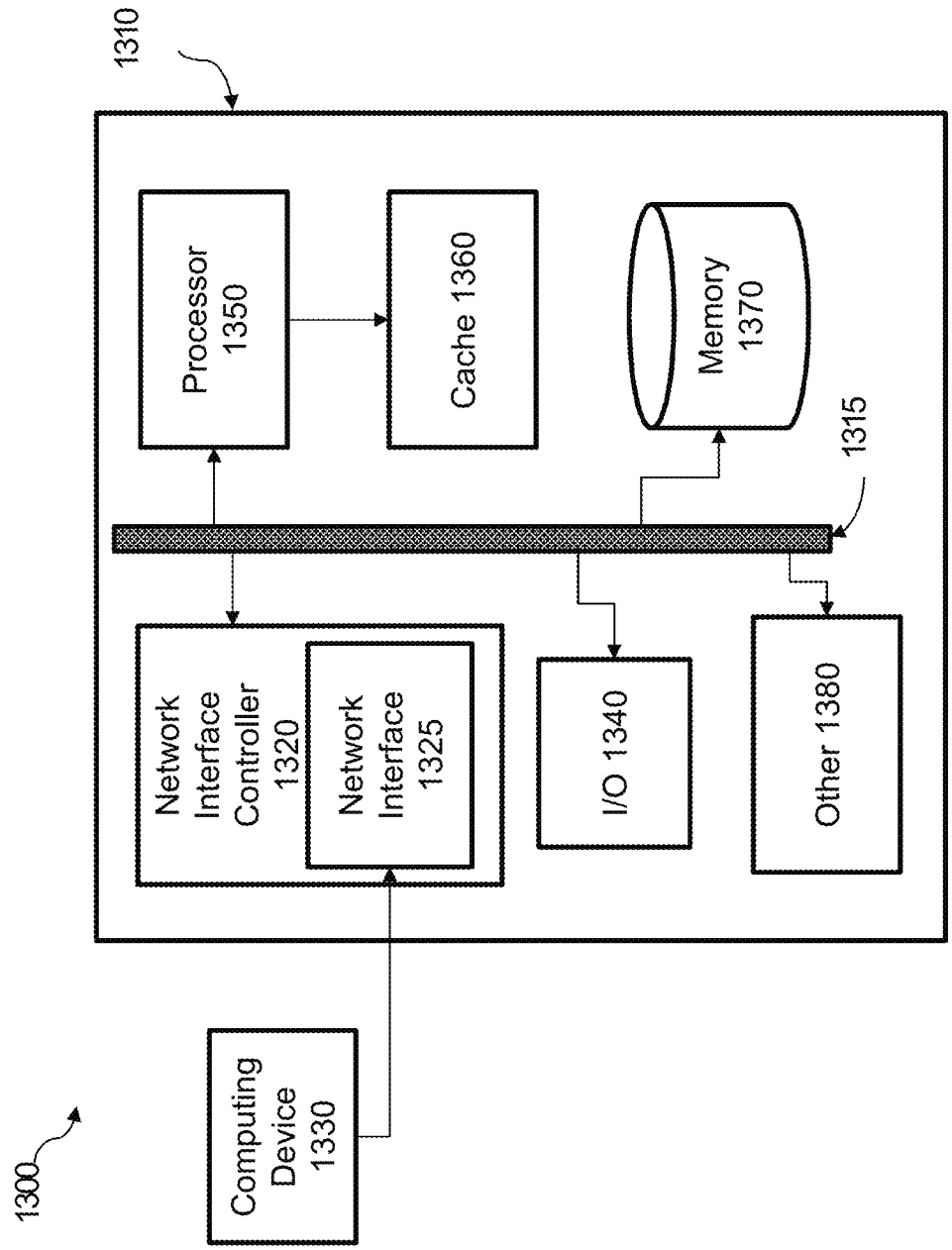
FIG. 13 is a block diagram of an exemplary computing system in accordance with an illustrative implementation of the fuel dispenser authorization and control system of FIG. 2.

FIG. 13 is a block diagram 1300 of a computing system 1310 suitable for use in implementing the computerized components described herein, such as a computing devices or server devices 110, 130, 155, 180, 188 and 196 shown in FIG. 1. In broad overview, the computing system 1310 includes at least one processor 1350 for performing actions in accordance with instructions, and one or more memory devices 1360 and/or 1370 for storing instructions and data. The illustrated example computing system 1310 includes one or more processors 1350 in communication, via a bus 1315, with memory 1370 and with at least one network interface controller 1320 with a network interface 1325 for connecting to external devices 1330, e.g., a computing device (such as a computing devices 110, 130, 155, 180, 188 and 196). The one or more processors 1350 are also in communication, via the bus 1315, with each other and with any I/O devices at one or more I/O interfaces 1340, and any other devices 1380. The processor 1350 illustrated incorporates, or is directly connected to, cache memory 1360. Generally, a processor will execute instructions received from memory. In some embodiments, the computing system 1310 can be configured within a cloud computing environment, a virtual or containerized computing environment, and/or a web-based microservices environment.

In more detail, the processor 1350 can be any logic circuitry that processes instructions, e.g., instructions fetched from the memory 1370 or cache 1360. In many embodiments, the processor 1350 is an embedded processor, a microprocessor unit or special purpose processor. The computing system 1310 can be based on any processor, e.g., suitable digital signal processor (DSP), or set of processors, capable of operating as described herein. In some embodiments, the processor 1350 can be a single core or multi-core processor. In some embodiments, the processor 1350 can be composed of multiple processors.

The memory 1370 can be any device suitable for storing computer readable data. The memory 1370 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 1310 can have any number of memory devices 1370.

The cache memory 1360 is generally a form of high-speed computer memory placed in close proximity to the processor 1350 for fast read/write times. In some implementations, the cache memory 1360 is part of, or on the same chip as, the processor 1350.

The network interface controller 1320 manages data exchanges via the network interface 1325. The network interface controller 1320 handles the physical, media access control, and data link layers of the Open Systems Interconnect (OSI) model for network communication. In some implementations, some of the network interface controller's tasks are handled by the processor 1350. In some implementations, the network interface controller 1320 is part of the processor 1350. In some implementations, a computing device 1310 has multiple network interface controllers 1320. In some implementations, the network interface 1325 is a connection point for a physical network link, e.g., an RJ 45 connector. In some implementations, the network interface controller 1320 supports wireless network connections and an interface port 1325 is a wireless Bluetooth transceiver. Generally, a computing device 1310 exchanges data with other network devices 1330, such as computing device 1330, via physical or wireless links to a network interface 1325. In some implementations, the network interface controller 1320 implements a network protocol such as LTE, TCP/IP Ethernet, IEEE 802.11, IEEE 802.16, Bluetooth, or the like.

The other computing devices 1330 are connected to the computing device 1310 via a network interface port 1325. The other computing device 1330 can be a peer computing device, a network device, a server, or any other computing device with network functionality. In some embodiments, the computing device 1330 can be a network device such as a hub, a bridge, a switch, or a router, connecting the computing device 1310 to a data network such as the Internet.

In some uses, the I/O interface 1340 supports an input device and/or an output device (not shown). In some uses, the input device and the output device are integrated into the same hardware, e.g., as in a touch screen. In some uses, such as in a server context, there is no I/O interface 1340 or the I/O interface 1340 is not used. In some uses, additional other components 1380 are in communication with the computer system 1310, e.g., external devices connected via a universal serial bus (USB).

The other devices 1380 can include an I/O interface 1340, external serial device ports, and any additional co-processors. For example, a computing system 1310 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 1310, e.g., a touch screen on a tablet device. In some implementations, a computing device 1310 includes an additional device 1380 such as a co-processor, e.g., a math co-processor that can assist the processor 1350 with high precision or complex calculations.

Exemplary technical effects of the methods, systems, apparatuses, and non-transitory machine readable storage mediums described herein include, by way of non-limiting example, providing dynamically configurable remote content via a display frame of a display of a fuel dispenser. The remote content can include instances of applications and application data displayed within a configurable arrangement of display frames that can be provided based on preferences of a fuel dispenser operator. The display frames and application data provided therein can be easily configured via a configuration file identifying a file location of the application data and a file location associated with an API used to convey modified instances of the application data. In this way, the need to additional storage to host the application data locally on a computing device or memory device associated with the fuel dispenser is eliminated. This can improve the ease of retrofitting or upgrading legacy fuel dispensers to provide more robust displays of application data and as a result can enhance the user experience for users of the fuel dispenser.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
   receiving, by a data processor of a fuel dispenser, first data characterizing a configuration file including an application programming interface (API) uniform resource locator (URL) associated with a first remote server, an application URL identifying a file location of one or more applications to be displayed via a display of the fuel dispenser during a first application session, and one or more display frame parameters associated with displaying the one or more applications in at least one display frame provided via the display;
   receiving, by the data processor, a first instance of at least one application from the first remote server responsive to accessing the file location identified in the application URL via the API URL;
   displaying, based on the one or more display frame parameters, the first instance of the at least one application in the at least one display frame, the at least one application configured to receive user inputs from a user of the fuel dispenser;

receiving, by the data processor of the fuel dispenser, second data characterizing a user input provided to the first instance of the at least one application via the at least one display frame;

determining, by the data processor of the fuel dispenser, modified application data associated with the first instance of the at least one application based on the user input;

generating, by the data processor, a second instance of the at least one application based on the modified application data; and displaying, within the at least one display frame, the second instance of the at least one application via the API URL.

2. The method of claim 1, wherein the one or more display frame parameters include at least one of a fuel pump ID, a phone number of the user, a loyalty identifier of the user, a digital receipt phone number, and a fuel dispenser state.

3. The method of claim 1, wherein instances of the one or more applications are stored in a memory of the fuel dispenser or are received via a communication module of the fuel dispenser from the first remote server associated with the at least one application.

4. The method of claim 1, wherein the modified application data is further determined based on event data generated by the data processor of the fuel dispenser, the event data including at least one of a display size change, a language change, a display contrast change, a volume change, or a fuel dispenser state change.

5. The method of claim 4, wherein responsive to generating the fuel dispenser state change event data during the first application session, the method further comprises determining, by the data processor of the fuel dispenser, a third instance of the at least one application to be displayed during the first application session, displaying, via the at least one display frame, the third instance of the at least one application, receiving, by the data processor of the fuel dispenser, a second user input including a phone number of the user provided to the third instance of the at least one application, and transmitting, responsive to the second user input, a fourth instance of the at least one application to a computing device of the user, the fourth instance displayed on the computing device of the user as a second application session of the at least one application.

6. The method of claim 5, wherein the fourth instance of the at least one application includes an order corresponding to one or more items or services provided for selection via the third instance of the at least one application and selected by the user from within the at least one display frame.

7. The method of claim 6, wherein the order is transmitted to the first remote server associated with the at least one application and the first remote server is configured to transmit the order to a kitchen display system configured to display the order for fulfillment.

8. The method of claim 5, wherein the third instance of the at least one application further comprises an authentication challenge displayed via the at least one display frame, the method further comprising receiving, by the data processor of the fuel dispenser, authentication credentials of the user, transmitting, by the communication module of the fuel dispenser, the authentication credentials to the first remote server associated with the at least one application, determining, by the first remote server, a verified identity of the user based on matching the authentication credentials to second authentication credentials associated with at least one application configured on the computing device of the user, transmitting, by the first remote server, an indication of the verified identity of the user to the data processor of the fuel dispenser, and providing, by the data processor, the indication of the verified identity of the user for display via the at least one display frame responsive to receiving the transmitted indication and prior to transmitting the fourth instance of the application as the second application session.

9. The method of claim 1, wherein the fuel dispenser is communicably coupled to a second remote server associated with a first entity and the one or more applications are associated with a second entity different than the first entity.

10. The method of claim 9, wherein the first data is received from the second remote server.

11. A fuel dispenser comprising:

a display comprising one or more display frames, a communications module, a data processor, and a memory storing non-transitory computer-readable instructions, which when executed by the data processor cause the data processor to perform operations comprising receiving first data characterizing a configuration file including an application programming interface (API) uniform resource locator (URL) associated with a first remote server, an application URL identifying a file location of one or more applications to be displayed via the display during a first application session, and one or more display frame parameters associated with displaying the one or more applications in at least one display frame provided via the display;

receiving a first instance of at least one application from the first remote server responsive to accessing the file location identified in the application URL via the API URL;

displaying, based on the one or more display frame parameters, the first instance of the at least one application in the at least one display frame, the at least one application configured to receive user inputs from a user of the fuel dispenser;

receiving second data characterizing a user input provided to the first instance of the at least one application via the at least one display frame;

determining modified application data associated with the first instance of the at least one application based on the user input;

generating a second instance of the at least one application based on the modified application data; and displaying the second instance of the at least one application via the API URL within the at least one display frame.

12. The fuel dispenser of claim 11, wherein the one or more display frame parameters include at least one of a fuel pump ID, a phone number of the user, a loyalty identifier of the user, a digital receipt phone number, and a fuel dispenser state.

13. The fuel dispenser of claim 11, wherein instances of the one or more applications are stored in the memory of the fuel dispenser or are received via the communication module of the fuel dispenser from the first remote server associated with the at least one application.

14. The fuel dispenser of claim 11, wherein the modified application data is further determined based on event data generated by the data processor, the event data including at least one of a display size change, a language change, a display contrast change, a volume change, or a fuel dispenser state change.

15. The fuel dispenser of claim 14, wherein responsive to generating the fuel dispenser state change event data during the first application session, the data processor is configured to further perform operations comprising
    determining a third instance of the at least one application to be displayed during the first application session,
    displaying, via the at least one display frame, the third instance of the at least one application,
    receiving a second user input including a phone number of the user provided to the third instance of the at least one application, and
    transmitting, via the communication module and responsive to the second user input, a fourth instance of the at least one application to a computing device of the user, the fourth instance displayed on the computing device of the user as a second application session of the at least one application.

16. The fuel dispenser of claim 15, wherein the fourth instance of the at least one application includes an order corresponding to one or more items or services provided for selection via the third instance of the at least one application and selected by the user from within the at least one display frame.

17. The fuel dispenser of claim 16, wherein the order is transmitted to the first remote server associated with the at least one application and the first remote server is configured to transmit the order to a kitchen display system configured to display the order for fulfillment.

18. The fuel dispenser of claim 15, wherein the third instance of the at least one application further comprises an authentication challenge displayed via the at least one display frame, the data processor is configured to further perform operations comprising
    receiving authentication credentials of the user,
    transmitting, via the communication module, the authentication credentials to the first remote server associated with the at least one application,
    receiving, by the data processor, an indication of a verified identity of the user from the first remote server, the verified identity determined by the first remote server by matching the authentication credentials with second authentication credentials associated with the at least one application configured on the computing device of the user; and
    providing the indication of the verified identity of the user for display via the at least one display frame responsive to the receiving the transmitted indication and prior to transmitting the fourth instance of the application as the second application session.

19. The fuel dispenser of claim 11, wherein the fuel dispenser is communicably coupled to a second remote server associated with a first entity and the one or more applications are associated with a second entity different than the first entity.

20. The fuel dispenser of claim 19, wherein the first data is received from the second remote server.

21. A non-transitory computer readable medium storing computer-readable and executable instructions, which when executed by at least one data processor of at least one computing system cause the at least one data processor to perform operations comprising:
    receiving first data characterizing a configuration file including an application programming interface (API) uniform resource locator (URL) associated with a first remote server, an application URL identifying a file location of one or more applications to be displayed via a display of a fuel dispenser during a first application session, and one or more display frame parameters associated with displaying the one or more applications in at least one display frame provided via the display;
    receiving a first instance of at least one application from the first remote server responsive to accessing the file location identified in the application URL via the API URL;
    providing, based on the one or more display frame parameters, the first instance of the at least one application for display in the at least one display frame of the display, the at least one application configured to receive user inputs from a user of the fuel dispenser;
    receiving second data characterizing a user input provided to the first instance of the at least one application via the at least one display frame;
    determining modified application data associated with the first instance of the at least one application based on the user input;
generating, by the data processor, a second instance of the at least one application based on the modified application data; and
    providing, within the at least one display frame, the second instance of the at least one application for display via the API URL.

* * * * *